(12) United States Patent
Akiyama et al.

(10) Patent No.: US 9,419,720 B2
(45) Date of Patent: Aug. 16, 2016

(54) OPTICAL SIGNAL TRANSMITTER

(71) Applicant: FUJITSU LIMITED, Kawasaki-shi, Kanagawa (JP)

(72) Inventors: Yuichi Akiyama, Kawasaki (JP); Hideyuki Miyata, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/629,123

(22) Filed: Feb. 23, 2015

(65) Prior Publication Data

US 2015/0229406 A1 Aug. 13, 2015

Related U.S. Application Data

(62) Division of application No. 12/494,812, filed on Jun. 30, 2009, now abandoned.

(30) Foreign Application Priority Data

Sep. 26, 2008 (JP) .................. 2008-247210

(51) Int. Cl.
| | | |
|---|---|---|
| *H04J 14/00* | (2006.01) | |
| *H04B 10/54* | (2013.01) | |
| *G02F 1/01* | (2006.01) | |
| *H04B 10/50* | (2013.01) | |
| *H04B 10/532* | (2013.01) | |
| *H04B 10/556* | (2013.01) | |
| *H04J 14/06* | (2006.01) | |

(52) U.S. Cl.
CPC ............. *H04B 10/54* (2013.01); *G02F 1/0123* (2013.01); *G02F 1/0136* (2013.01); *H04B 10/505* (2013.01); *H04B 10/532* (2013.01); *H04B 10/5561* (2013.01); *H04J 14/06* (2013.01)

(58) Field of Classification Search
CPC ........................... H04B 10/505; H04B 10/532
See application file for complete search history.

(56) References Cited

U.S. PATENT DOCUMENTS

| 6,031,647 A | 2/2000 | Roberts |
| 6,396,601 B1 | 5/2002 | Takara et al. |
| 6,407,845 B2 | 6/2002 | Nakamoto |

(Continued)

FOREIGN PATENT DOCUMENTS

| CN | 1848554 A | 10/2006 |
| CN | 1972161 A | 5/2007 |

(Continued)

OTHER PUBLICATIONS

Office Action mailed Sep. 3, 2013 in corresp. Japanese Appln. No. 2008-247210.

(Continued)

*Primary Examiner* — Ken N Vanderpuye
*Assistant Examiner* — Amritbir Sandhu
(74) *Attorney, Agent, or Firm* — Staas & Halsey LLP

(57) ABSTRACT

An optical signal transmitter includes first and second modulation units, a combiner, and a control unit. The first and second modulation units generate first and second modulated optical signals, respectively. The combiner combines the first and second modulated optical signals to generate a polarization multiplexed optical signal. The control unit controls at least one of the first and second modulation units so that the optical powers of the first and second modulated optical signals become approximately equal to each other.

3 Claims, 34 Drawing Sheets

(56) References Cited

U.S. PATENT DOCUMENTS

| | | | |
|---|---|---|---|
| 6,421,155 B1* | 7/2002 | Yano | H04B 10/25137 398/183 |
| 6,714,742 B1 | 3/2004 | Hayee et al. | |
| 6,819,872 B2 | 11/2004 | Farries et al. | |
| 6,850,712 B1* | 2/2005 | Delavaux | H04B 10/2537 398/183 |
| 6,983,085 B2 | 1/2006 | Kataoka et al. | |
| 7,149,424 B2 | 12/2006 | Kamalov et al. | |
| 7,349,454 B2 | 3/2008 | Quek et al. | |
| 7,715,730 B2 | 5/2010 | Hecker et al. | |
| 7,865,080 B2* | 1/2011 | Hecker | H04J 14/02 398/152 |
| 2002/0015212 A1 | 2/2002 | Fujiwara et al. | |
| 2003/0147646 A1* | 8/2003 | Zitelli | H04B 10/505 398/65 |
| 2003/0175037 A1* | 9/2003 | Kimmitt | G02F 1/0123 398/198 |
| 2003/0185575 A1 | 10/2003 | Ikeuchi | |
| 2003/0206349 A1* | 11/2003 | Gage | G02B 6/2773 359/489.08 |
| 2004/0028418 A1 | 2/2004 | Kaplan et al. | |
| 2004/0042061 A1 | 3/2004 | Islam et al. | |
| 2004/0208646 A1* | 10/2004 | Choudhary | H04B 10/505 398/188 |
| 2005/0111854 A1* | 5/2005 | Miyazaki | H04B 10/505 398/188 |
| 2005/0220161 A1 | 10/2005 | Bolshtyansky et al. | |
| 2005/0265730 A1 | 12/2005 | Yasue et al. | |
| 2006/0127103 A1* | 6/2006 | Mazurczyk | H04B 10/505 398/188 |
| 2006/0210283 A1* | 9/2006 | Shirasaki | H04B 10/505 398/188 |
| 2006/0263097 A1 | 11/2006 | Akiyama et al. | |
| 2006/0263098 A1 | 11/2006 | Akiyama et al. | |
| 2007/0064240 A1* | 3/2007 | Hill | G01B 11/272 356/487 |
| 2007/0065161 A1* | 3/2007 | Miura | G02F 1/0123 398/186 |
| 2007/0122161 A1 | 5/2007 | Charlet et al. | |
| 2007/0212075 A1 | 9/2007 | Yin | |
| 2007/0217357 A1 | 9/2007 | Kitakoda | |
| 2007/0230625 A1* | 10/2007 | Hironishi | H04B 10/66 375/329 |
| 2007/0297796 A1* | 12/2007 | Calabro | H04B 10/505 398/43 |
| 2008/0056728 A1* | 3/2008 | Kozato | H04B 10/505 398/183 |
| 2008/0080872 A1 | 4/2008 | Tanaka et al. | |
| 2008/0112710 A1 | 5/2008 | Tanaka et al. | |
| 2008/0187324 A1 | 8/2008 | Akiyama et al. | |
| 2008/0302982 A1* | 12/2008 | Wang | G02B 5/1809 250/551 |
| 2009/0057536 A1* | 3/2009 | Hirose | G01J 1/04 250/208.1 |
| 2009/0060508 A1* | 3/2009 | Tanimura | H04B 10/505 398/65 |
| 2009/0257755 A1* | 10/2009 | Buelow | H04B 10/505 398/184 |
| 2009/0269080 A1* | 10/2009 | Akiyam | H04B 10/5051 398/188 |
| 2009/0273767 A1* | 11/2009 | Makinouchi | G01D 5/266 355/53 |
| 2010/0034537 A1 | 2/2010 | Zhang et al. | |
| 2010/0080571 A1* | 4/2010 | Akiyama | G02F 1/0123 398/184 |
| 2012/0315043 A1* | 12/2012 | Nakagawa | H04B 10/5053 398/65 |
| 2016/0006537 A1* | 1/2016 | Inada | H04J 14/02 398/65 |

FOREIGN PATENT DOCUMENTS

| | | |
|---|---|---|
| EP | 0 762 677 A2 | 3/1997 |
| EP | 1 330 054 A2 | 7/2003 |
| EP | 1760520 A2 | 3/2007 |
| EP | 1816763 A1 | 8/2007 |
| EP | 1906564 A1 | 4/2008 |
| EP | 1923739 A1 | 5/2008 |
| EP | 1 939 679 A2 | 7/2008 |
| EP | 2109233 A1 * | 10/2009 |
| JP | 62-24731 | 2/1987 |
| JP | 10-215019 | 8/1998 |
| JP | 2002-31786 | 1/2002 |
| JP | 2002-344426 | 11/2002 |
| JP | 2003-249897 | 9/2003 |
| JP | 2005-65027 | 3/2005 |
| JP | 2008-92172 | 4/2008 |
| JP | 2008-122786 | 5/2008 |
| JP | 2008-197639 | 8/2008 |
| JP | 2009-60461 | 3/2009 |
| JP | 2009-239555 | 10/2009 |
| JP | 2009-272694 | 11/2009 |
| JP | 2010-57106 | 3/2010 |
| JP | 2010-68235 | 3/2010 |
| WO | 2005/076509 A1 | 8/2005 |
| WO | 2006/001362 | 1/2006 |

OTHER PUBLICATIONS

European Search Report dated Jan. 19, 2011 issued in corresponding European Patent Application 10177572.4.

Japanese Office Action mailed May 8, 2012 issued in corresponding Japanese Patent Application No. 2008-247210.

Chinese Office Action dated Jan. 31, 2012 issued in corresponding Chinese Patent Application No. 200910157317.5.

European Search Report dated Apr. 1, 2010 and issued in corresponding European Patent Application 09008444.3.

G. Charlet et al. ,"Transmission of 16.4Tbit/s Capacity over 2,550km using PDM QPSK Modulation Format and Coherent Receiver", Proceedings of OFC 2008, Paper PDP3, 3 pp.

O. Bertran-Pardo et al., "Nonlinearity Limitations When Mixing 40-Gb/s Coherent PDM-QPSK Channels With Preexisting 10-Gb/s NRZ Channels", IEEE Photonics Technology Letters, vol. 20, No. 15, Aug. 1, 2008, pp. 1314-1316.

J. Renaudier et al. ,"Linear Fiber Impairments Mitigation of 40-Gbit/s Polarization-Multiplexed QPSK by Digital Processing in a Coherent Receiver", Journal of Lightwave Technology, vol. 26, No. 1, Jan. 1, 2008, pp. 36-42.

D. van den Borne et al.,"1.6-b/s/Hz Spectrally Efficient Transmission over 1700 km of SSMF using 40×85.6-Gb/s POLMUX-RZ-DQPSK", Journal of Lightwave Technology, vol. 25, No. 1, Jan. 2007, pp. 222-232.

A. Sano et al., "30×100-Gb/s all-optical OFDM transmission over 1300 km SMF with 10 ROADM nodes", European Conference on Optical Communication (ECOC2007) post deadline paper, PD1.7, 2007, 2 pp.

Partial European Search Report dated Jan. 27, 2010 and issued in corresponding European Patent Application 09008444.3.

Office Action for U.S. Appl. No. 12/494,812 dated Apr. 19, 2013.
Office Action for U.S. Appl. No. 12/494,812 dated Oct. 10, 2013.
Office Action for U.S. Appl. No. 12/494,812 dated Aug. 25, 2014.
Office Action for U.S. Appl. No. 12/494,812 dated Feb. 10, 2014.
Office Action for U.S. Appl. No. 12/494,812 dated Oct. 3, 2012.
Office Action for U.S. Appl. No. 12/494,812 dated Apr. 10, 2012.
U.S. Appl. No. 12/494,812, filed Jun. 30, 2009, Yuichi Akiyama et al., Fujitsu Limited.

* cited by examiner

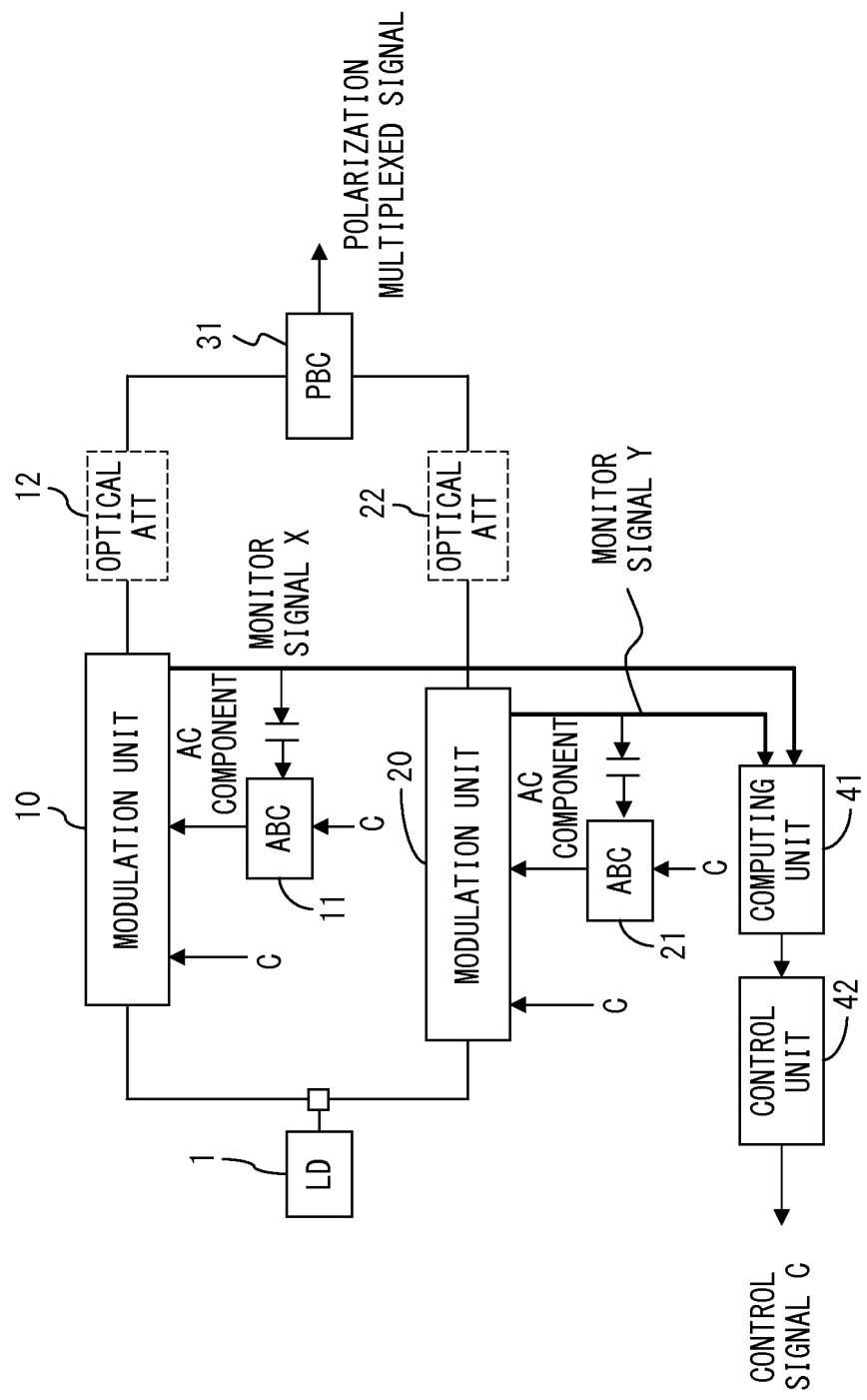
F I G. 1 A

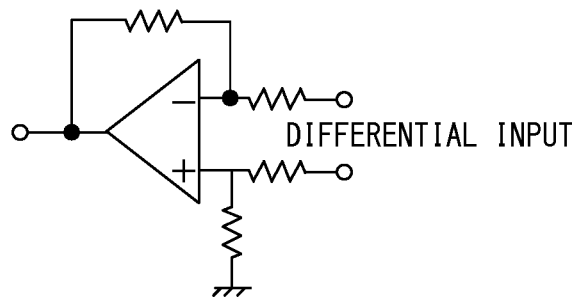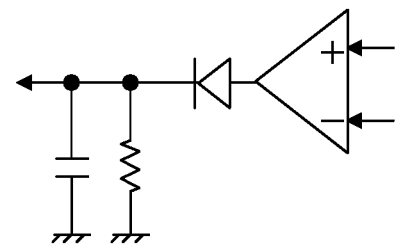
F I G. 5A   F I G. 5B

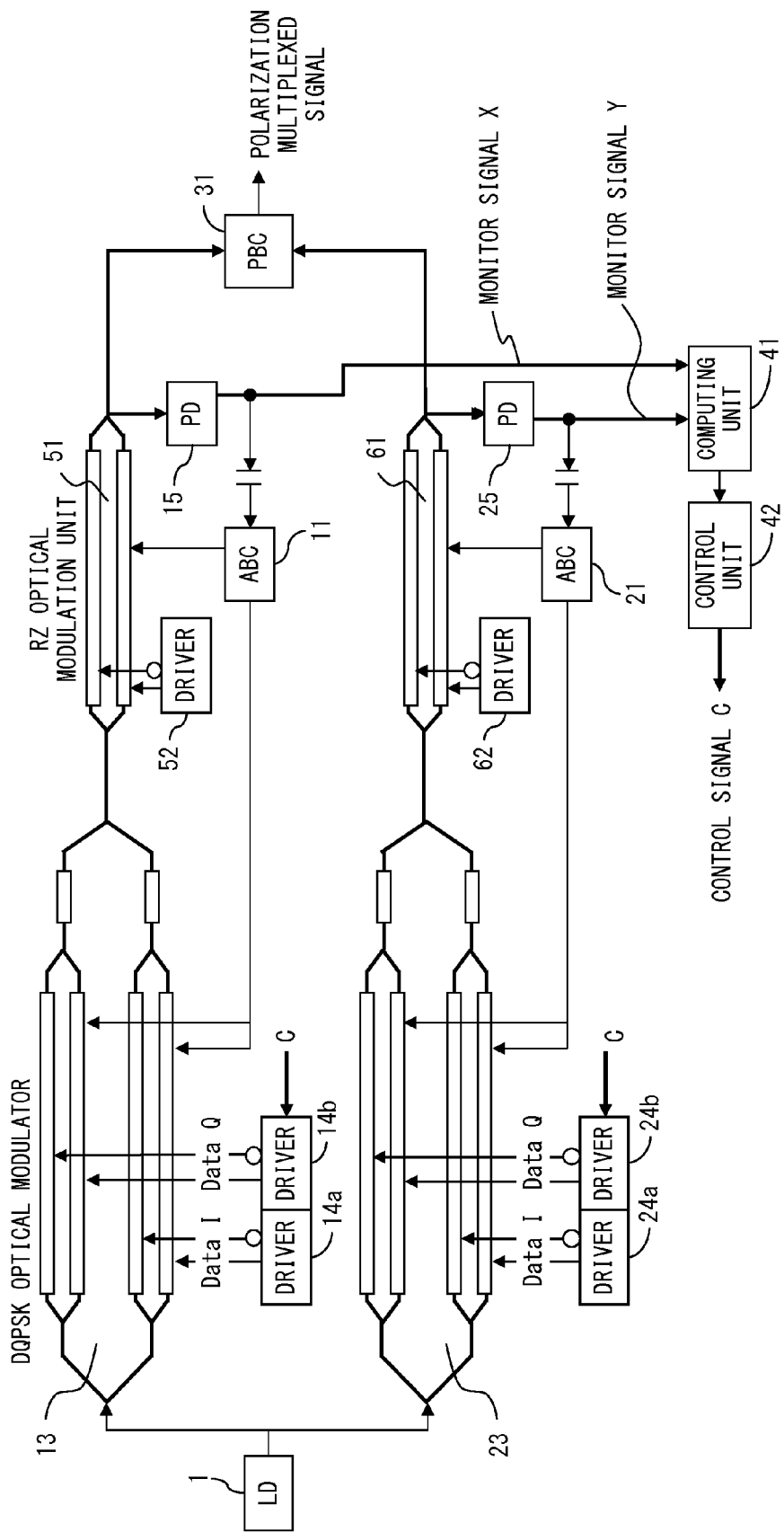
F I G. 6

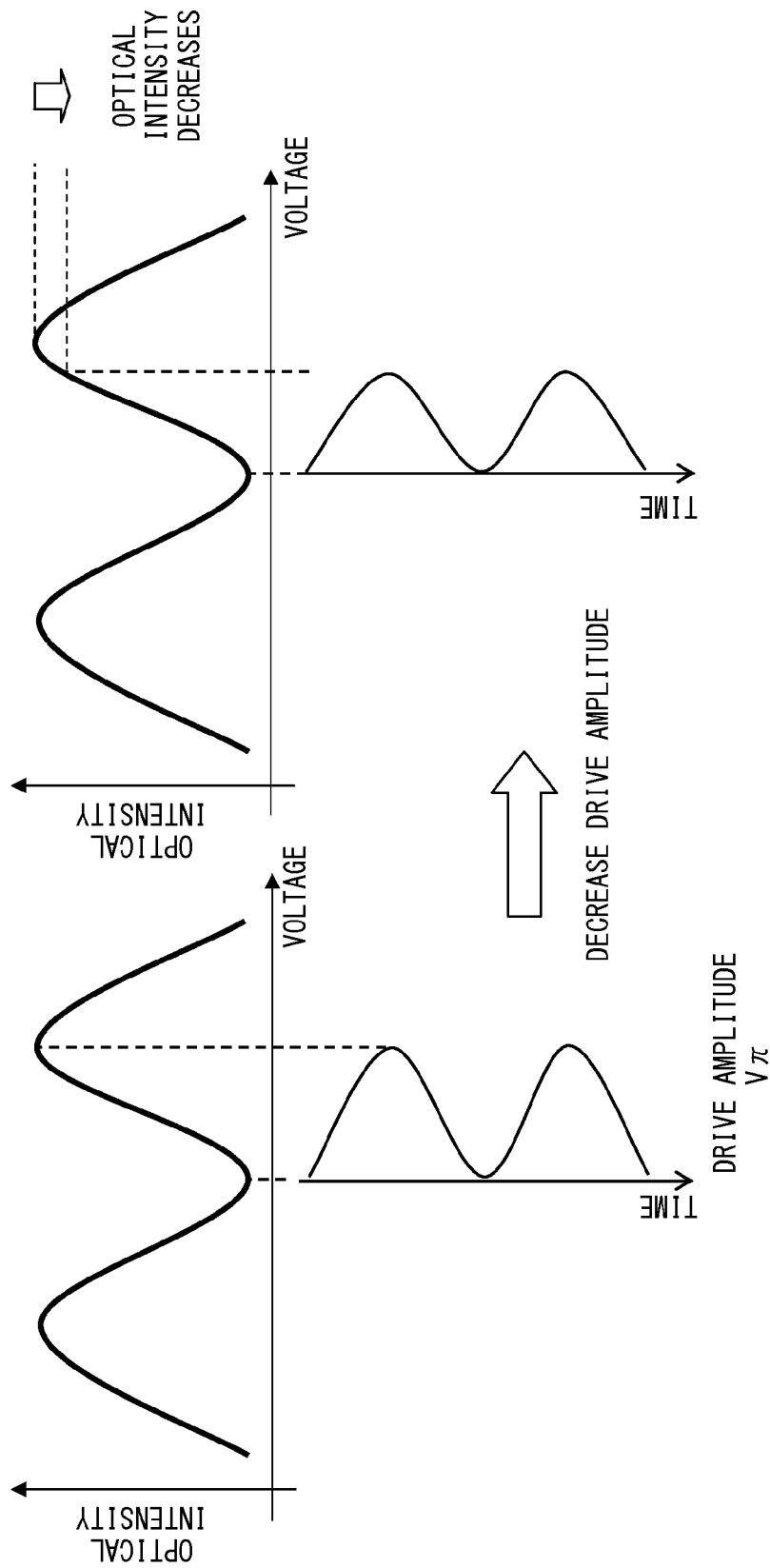
F I G. 8

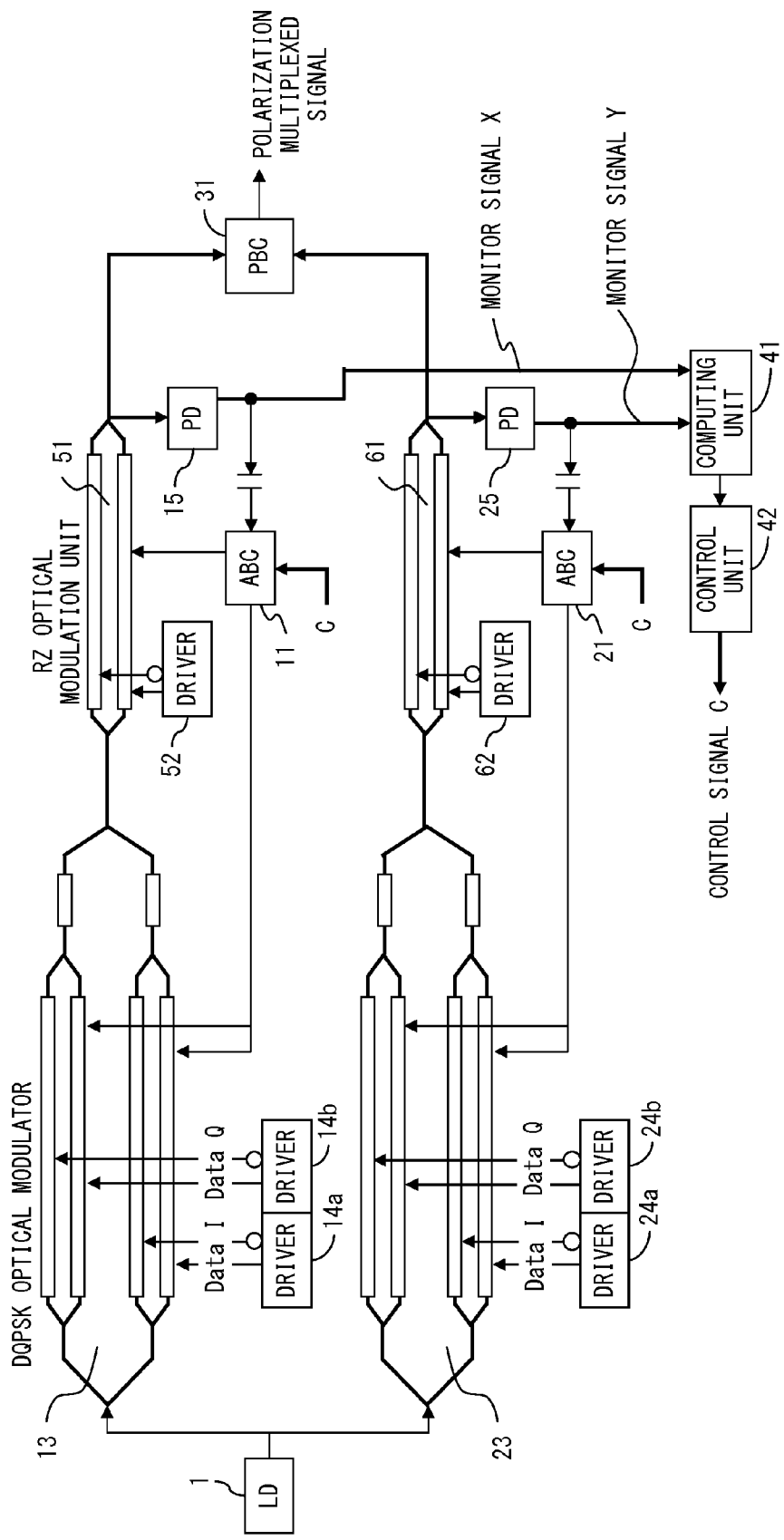
F I G. 1 0

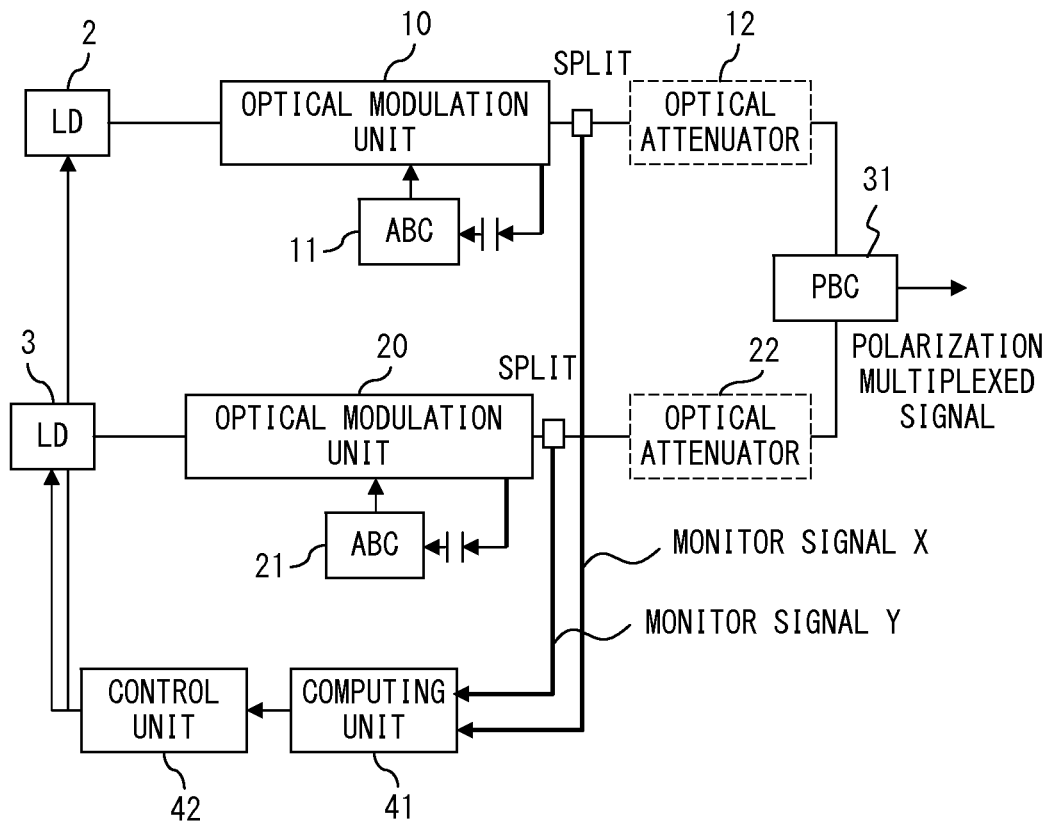
F I G. 1 2 B

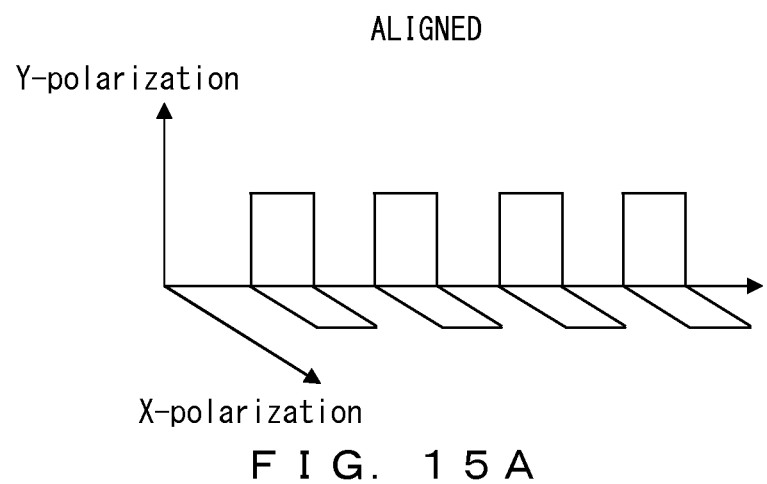
F I G. 1 5 A
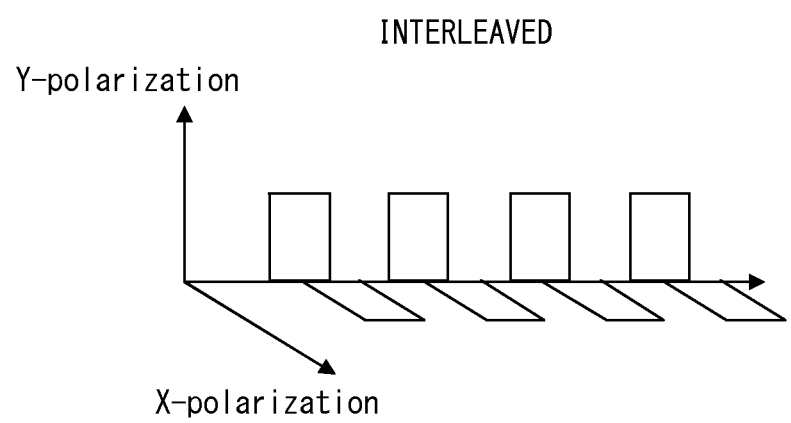
F I G. 1 5 B

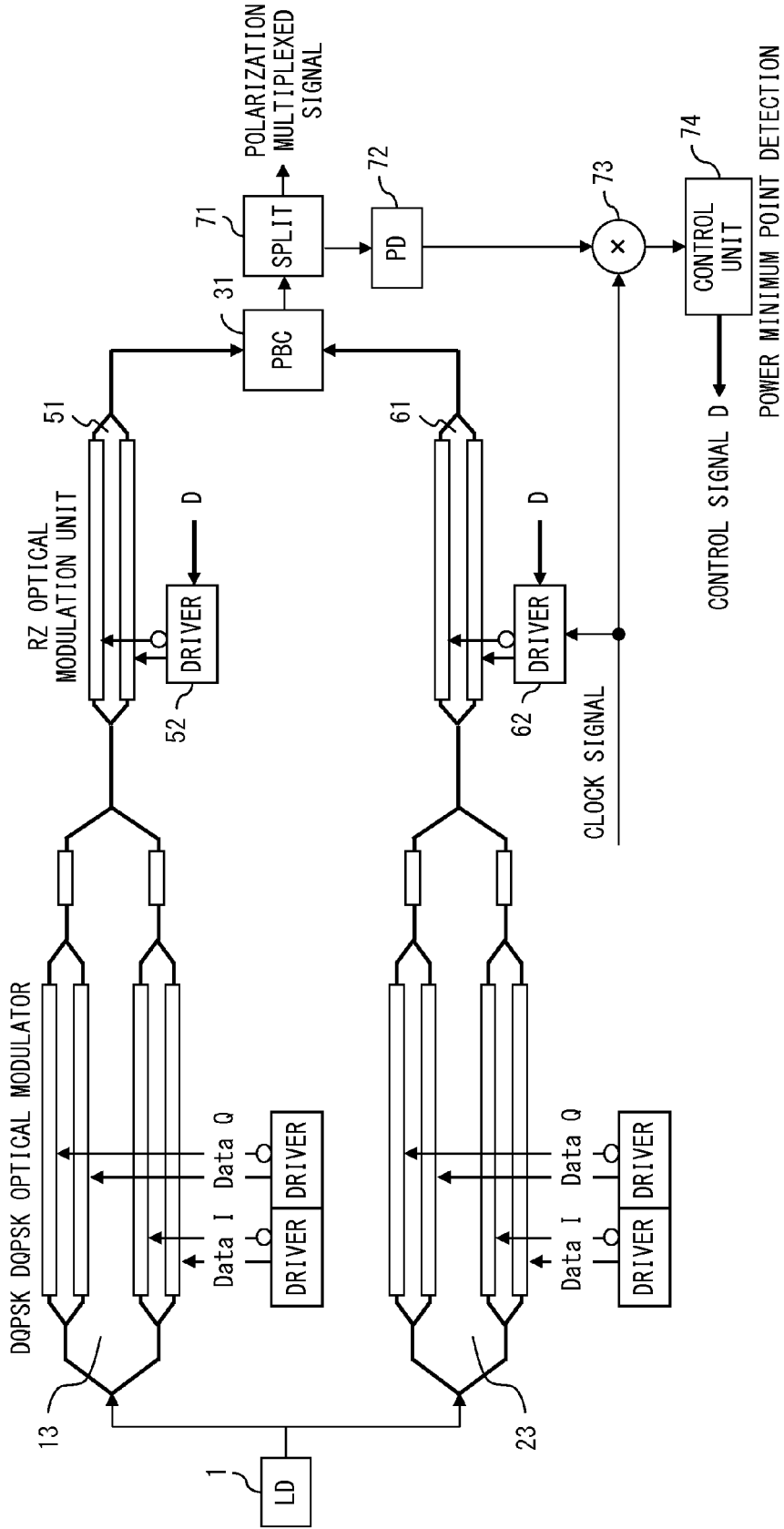
F I G. 19

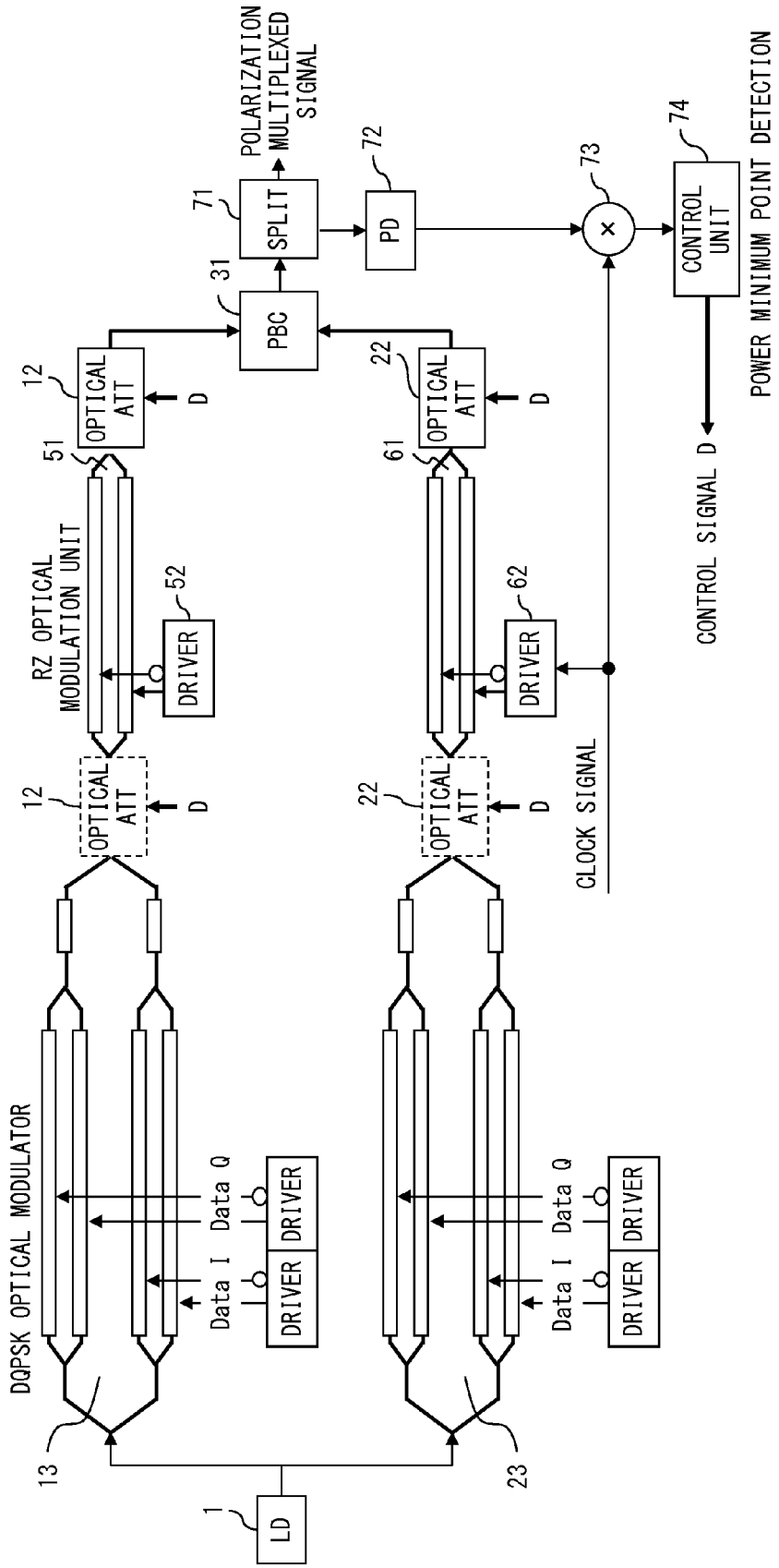
F I G. 2 1

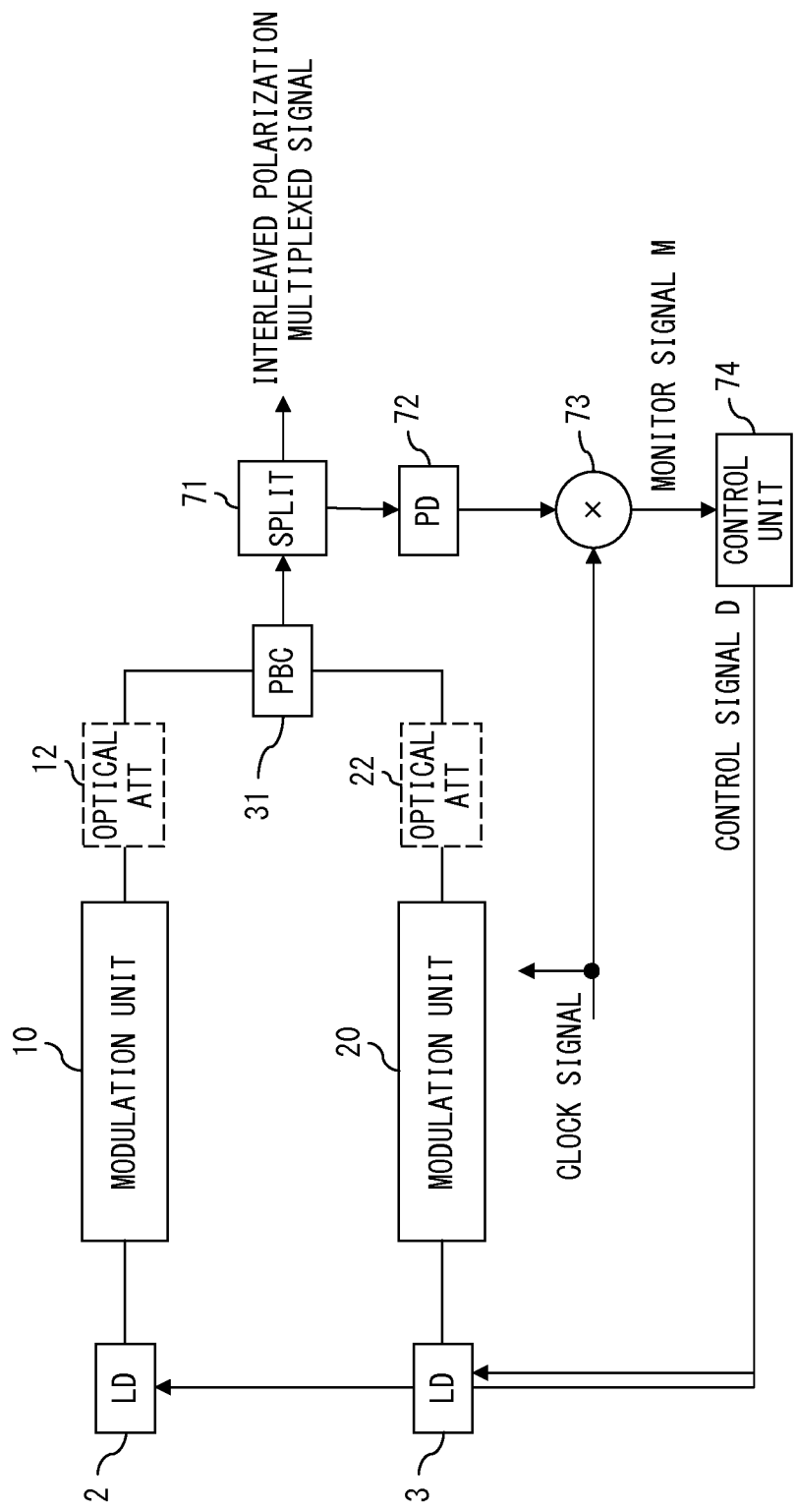
F I G. 22

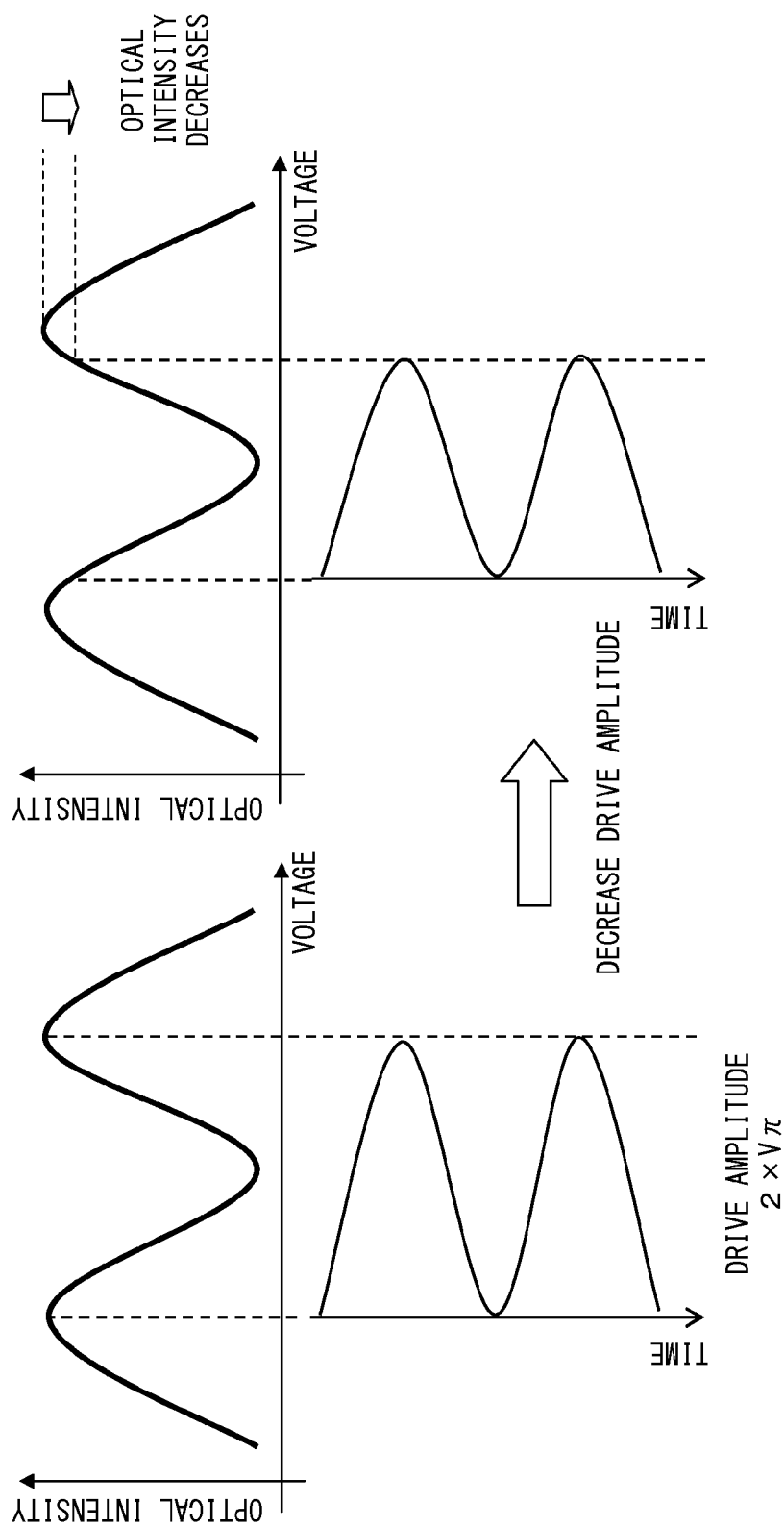
F I G. 26

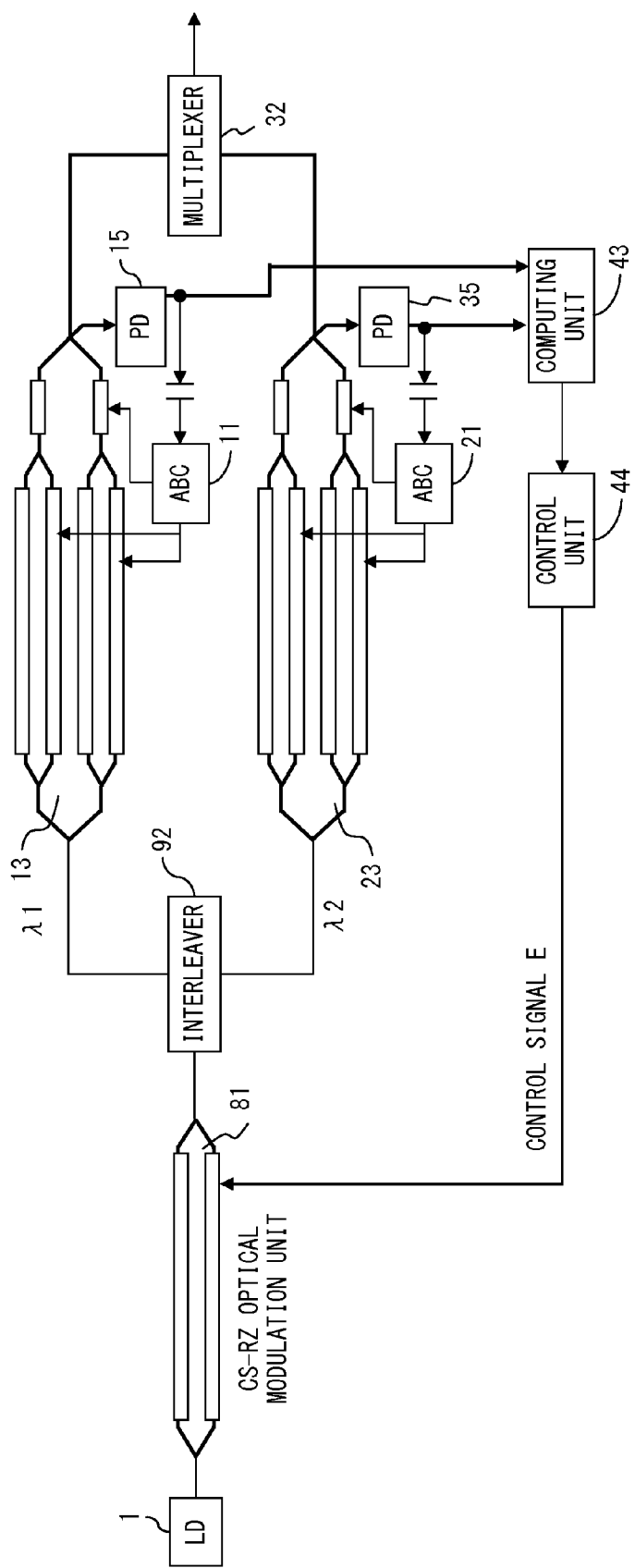
F I G. 28

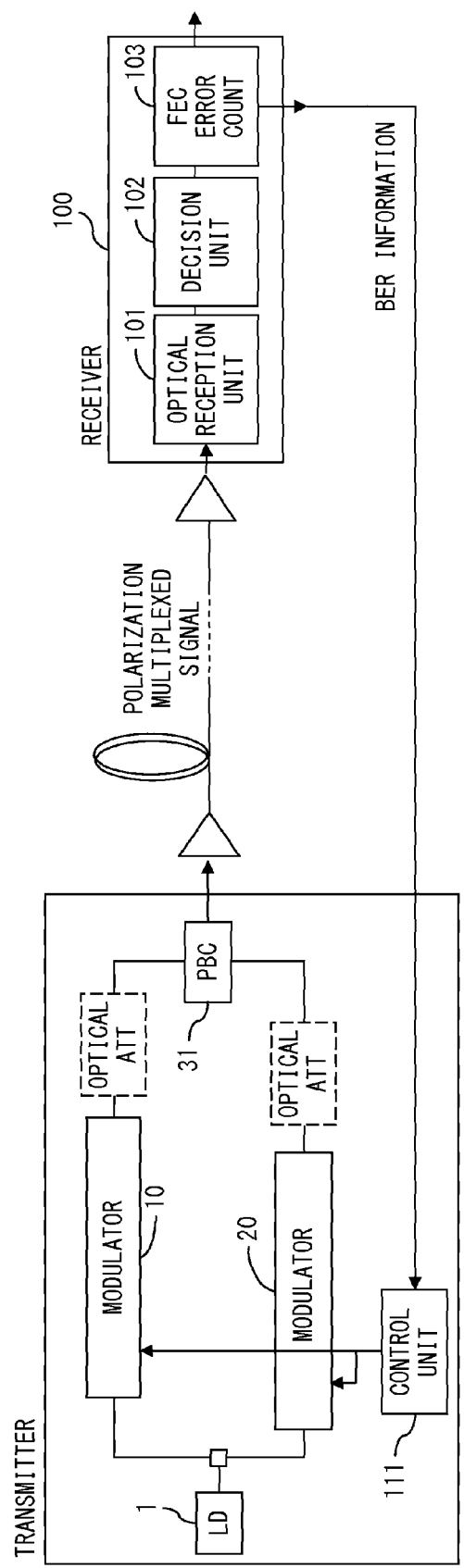
F I G. 29

OPTICAL SIGNAL TRANSMITTER

CROSS-REFERENCE TO RELATED APPLICATION

This application is a divisional of U.S. Ser. No. 12/494,812, filed Jun. 30, 2009, which is based upon and claims the benefit of priority of the prior Japanese Patent Application No. 2008-247210, filed on Sep. 26, 2008, the entire contents of both are incorporated herein by reference.

FIELD

The present invention relates to an optical signal transmitter, and may be applied to, for example, an optical signal transmitter used in a polarization multiplexing transmission system.

BACKGROUND

The demand for realizing a super-high-speed (over 40 Gbit/s, i.e., 100 Gbit/s, for example) optical transmission system has been increasing rapidly. For this reason, the development has been underway, for the practical realization of an optical transmission system adopting a multi-value modulation system (for example an RZ-DQPSK modulation system using quadrature phase modulation) that has been applied to the radio system. However, as the transmission signal speed increases, solving problems related to the viability of the electric signal circuit, and problems related to the degradation of optical transmission signals (such as the transmission signal spectrum degradation due to an optical filter, the signal degradation due to chromatic dispersion and accumulation of optical noises) becomes harder.

As a method for solving these problems to realize a large-capacity long-distance transmission system, an optical transmission system adopting the polarization division multiplexing and digital coherent detection has been attracting attention. The research and development for the commercialization of these techniques are in progress, and the techniques are disclosed in, for example, a document 1 (G. Charlet et al., "Transmission of 16.4 Tbit/s Capacity over 2,550 km using PDM QPSK Modulation Format and Coherent Receiver" presented at the OFC '08 Paper PDP3.), a document 2 (J. Renaudier, et al., "Linear Fiber Impairments Mitigation of 40-Gbit/s Polarization-Multiplexed QPSK by Digital Processing in a Coherent Receiver," J. Lightwave Technology., vol. 26, No. 1, pp. 36-42, January 2008.), and a document 3 (O. Bertran-Pardo et al., "Nonlinearity Limitations When Mixing 40-Gb/s Coherent PDM-QPSK Channels With Pre-existing 10-Gb/s NRZ Channels" IEEE Photonics Technology Letters, Vol. 20, No. 15, pp. 1314-1316, August 2008.).

According to the polarization division multiplexing, two data streams are transmitted using two polarized waves having the same wavelength and being orthogonal to each other. For this reason, the polarization division multiplexing contributes to the improvement of the characteristics of the electric signal generation circuit, cost reduction, size reduction and power-consumption reduction, as the modulation speed is reduced to half. In addition, effects due to the quality degradation factors such as the dispersion in the optical transmission path are reduced, improving the characteristics of the optical transmission system as a whole. For example, patent document 1 (Japanese Laid-open Patent Publication No. 62-024731) and patent document 2 (Japanese Laid-open Patent Publication No. 2002-344426) disclose transmission systems using the polarization division multiplexing.

In an optical signal transmitter that generates a polarization multiplexed signal, a modulator is provided for each polarization signal. For this reason, a difference in optical power between polarized waves of the optical signal may occur due to the variation of the characteristics (for example, optical loss) between the modulators, or, the variation of the optical losses of an optical splitter, an optical combiner and the like. The difference in optical power of the polarized waves causes the degradation of the transmission characteristics.

SUMMARY

An optical signal transmitter of one aspect of the invention includes: a first modulation unit configured to generate a first modulated optical signal; a second modulation unit configured to generate a second modulated optical signal; a combiner configured to combine the first and second modulated optical signals to generate a polarization multiplexed optical signal; and a control unit configured to control at least one of the first and second modulation units so that optical powers of the first and second modulated optical signals become approximately equal to each other.

An optical signal transmitter of another one aspect of the invention includes: a first modulation unit configured to generate a first modulated optical signal; a second modulation unit configured to generate a second modulated optical signal; a combiner configured to combine the first and second modulated optical signals to generate a polarization multiplexed optical signal; and a control unit configured to control at least one of the first and second modulation units. The first and second modulated optical signals have a same symbol rate and have timings shifted with respect to each other by a predetermined time. The control unit controls at least one of the first and second modulation units in accordance with the symbol rate component in the polarization multiplexed optical signal.

An optical signal transmitter of another one aspect of the invention includes: an intensity modulation unit configured to adjust an intensity of first and second wavelength components; a demultiplexer configured to extract the first and second wavelength components; a first modulation unit configured to generate a first modulated optical signal from the first wavelength component obtained by the demultiplexer; a second modulation unit configured to generate a second modulated optical signal from the second wavelength component obtained by the demultiplexer; a multiplexer configured to multiplex the first and second modulated optical signals to generate a multiplexed optical signal; and a control unit configured to control the intensity modulation unit so that optical powers of the first and second modulated optical signals become approximately equal to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are diagrams illustrating the configuration of an optical signal transmitter according to the first aspect.

FIGS. 5A and 5B illustrate an embodiment of a computing unit.

FIG. 6 illustrates the second embodiment of an optical signal transmitter.

FIG. 8 is a diagram illustrating the operation of an LN modulator used as an RZ modulator.

FIG. 10 illustrates the fourth embodiment of an optical signal transmitter.

FIGS. 12A and 12B are diagrams illustrating modified configurations of the first aspect.

FIGS. 15A and 15B are diagrams explaining Time-Interleaved polarization division multiplexing.

FIG. 19 illustrates the ninth embodiment of an optical signal transmitter.

FIG. 21 illustrates the eleventh embodiment of an optical signal transmitter.

FIG. 22 is a diagram illustrating a modified configuration of the second aspect.

FIG. 26 is a diagram explaining the operation of an LN modulator used as CS-RZ modulation.

FIG. 28 illustrates the fourteenth embodiment of an optical signal transmitter.

FIG. 29 is a diagram (1) illustrating the configuration for performing feedback control in accordance with the received signal quality.

DESCRIPTION OF EMBODIMENTS

Figure 1B:
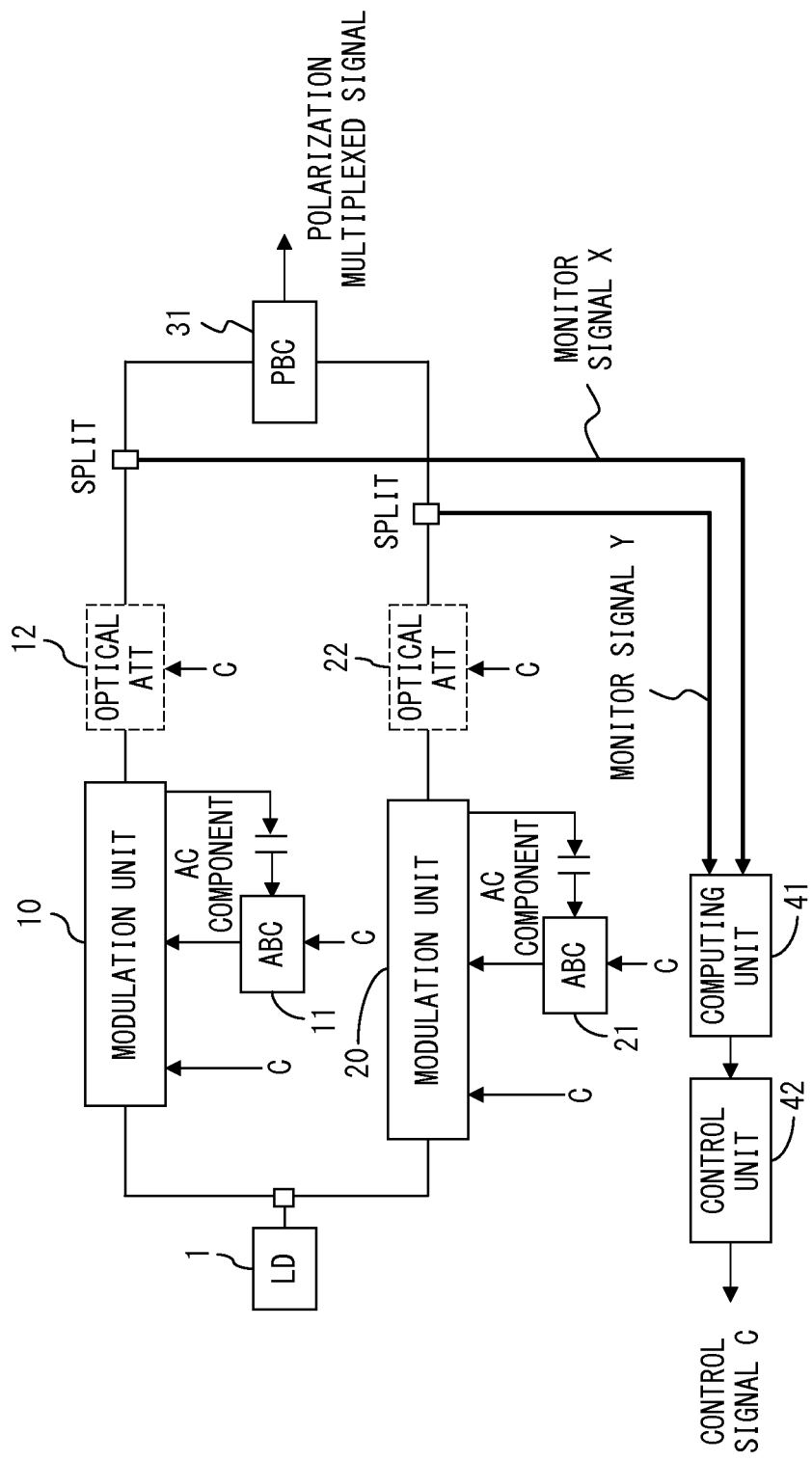

FIGS. 1A and 1B are diagrams illustrating the configuration of an optical signal transmitter according to the first aspect. The optical signal transmitter according to the first aspect transmits a polarization multiplexed optical signal obtained by the polarization division multiplexing of first and second modulated optical signals. At this time, a difference between the optical powers of the first and second modulated optical signals causes the deterioration of the characteristics of the polarization multiplexed optical signal. Therefore, in the first aspect, the powers of the first and second modulated optical signals are controlled to be equal or approximately equal.

A light source (LD) 1 is, for example, a laser diode, which generates an optical signal having a frequency. The optical signal is, for example, a continuous wave (CW) that is split by, for example, an optical splitter and directed to modulation units 10, 20.

The modulation unit 10 modulates an input optical signal in accordance with transmission data X to generate a modulated optical signal X. In the same manner, the modulation unit 20 modulates an input optical signal in accordance with transmission data Y to generate a modulated optical signal Y. The modulation units 10, 20 are configured to respectively include a modulator (in this example, a Mach-Zehnder LN modulator) with which the power of the output light periodically changes with respect to the drive voltage. Furthermore, ABC (Auto Bias Control) circuits 11, 21 are provided, in order to control the operating points (i.e., the bias) of the LN modulators of the modulators 10, 20. The ABC circuits 11, 21 apply a low-frequency voltage signal to the corresponding LN modulator, and respectively adjust the operating point (i.e., the DC bias voltage) of the LN modulator, in accordance with the low-frequency component contained in the output lights of the modulators 10, 20.

While an LN modulator is described herein as an example of the optical modulator, this is not a limitation. In other words, the optical modulator is not limited to the LN modulator, and may be a modulator using an electro-optic material, i.e., for example, a modulator configured with a semiconductor material such as InP.

Optical attenuators 12, 22 respectively adjust the powers of the modulated optical signals X, Y. The optical attenuators 12, 22 are not essential constituent elements. In addition, the optical attenuators 12, 22 may be disposed either on the input side of the modulators 10, 20, or within the modulators 10, 20, or on the output side of the modulators 10, 20.

Figure 2:
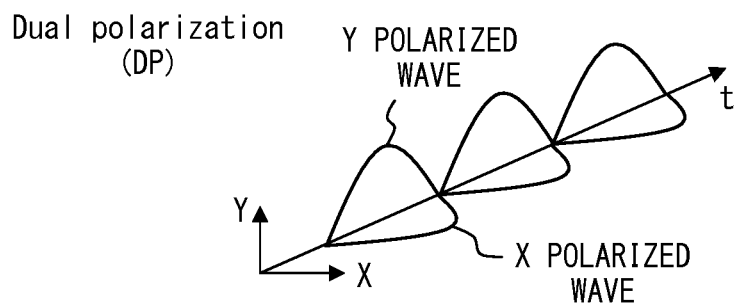
FIG. 2 is a diagram explaining polarization division multiplexing.

A polarization beam combiner (PBC) 31 performs polarization multiplex for the modulated optical signal X and modulated optical signal Y to generate polarization multiplexed optical signal. At this time, according to the polarization multiplex (or DP: dual polarization), as illustrated in FIG. 2, X polarized wave and Y polarized wave being orthogonal to each other are used. Specifically, the modulated optical signal X is propagated using the X polarized wave, and the modulated optical signal Y is propagated using the Y polarized wave.

A computing unit 41 calculates the difference between a monitor signal X representing the characteristics of the modulated optical signal X and a monitor signal Y representing the characteristics of the modulated optical signal Y. The monitor signals X and Y are, in the configuration illustrated in FIG. 1A, obtained using the DC component of the monitor signals referred to by the ABC circuits 11, 21. In the configuration illustrated in FIG. 1B, the monitor signals X, Y are obtained from the spilt-off portions of the modulated optical signals X, Y output from the modulators 10, 20. A control unit 42 generates, in order to perform feedback control, a control signal C for making the difference between the monitor signals X, Y zero. The "zero" here does not require being exactly zero, and includes a sufficiently small value.

The control signal C generated by the control unit 42 controls, for example, the amplitude of drive signals of the modulators 10, 20. Alternatively, the control signal C may be used to control the bias of the LN modulators provided in the modulators 10, 20. Furthermore, in the configuration in which the optical attenuators 12, 22 are provided, the control signal C may control the attenuation amount of the optical attenuators 12, 22. In either case, a feedback system for making the difference between the monitor signals X, Y zero is formed.

The feedback control in the configuration described above makes the powers of the modulated optical signals X, Y approximately equal to each other. That is, the powers of the X polarized wave and the Y polarized wave of the polarization multiplexed optical signal become approximately equal to each other. Therefore, the transmission characteristics of the polarization multiplexed optical signal are improved.

Figure 3:
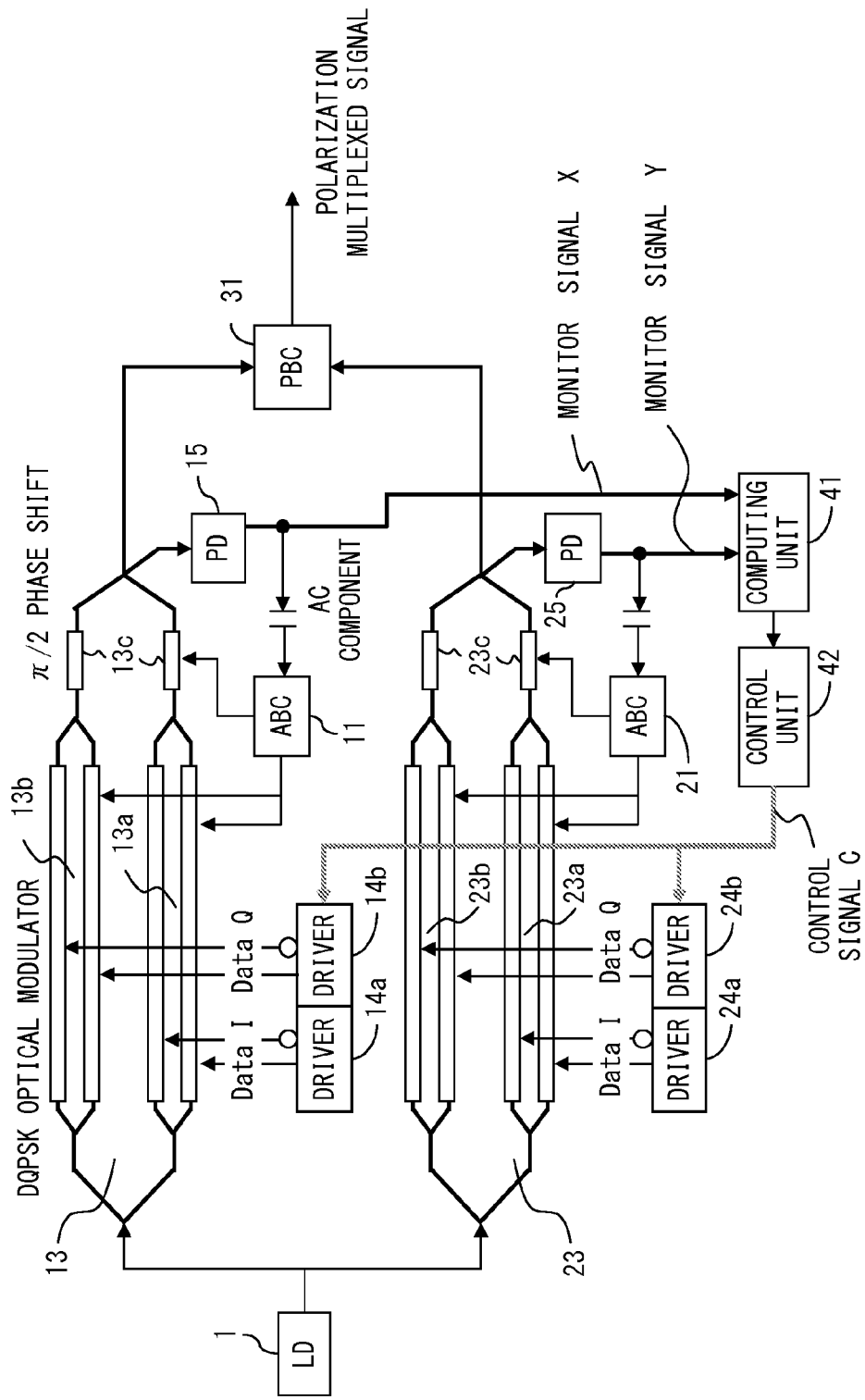
FIG. 3 illustrates the first embodiment of an optical signal transmitter.

FIG. 3 illustrates the first embodiment of the optical signal transmitter. In this embodiment, it is assumed that transmission data X and transmission data Y are transmitted by means of a polarization multiplexed optical signal. In addition, in the first embodiment, data are transmitted according to the NRZ-DQPSK modulation. Meanwhile, the modulation method is not limited to the DQPSK, DPSK, and other multi-value modulation methods. For example, as disclosed in U.S. Patent Application Publication No. 2006/0127102, the optical transmitter may be equipped with an optical modulator that changes the optical phase as a vector by filtering a data signal.

In FIG. 3, the modulation unit 10 illustrated in FIG. 1A or FIG. 1B has a DQPSK optical modulator 13, driver circuits 14a, 14b, and a photodetector (PD) 15. The DQPSK optical modulator 13 has, in this embodiment, LN modulators 13a, 13b, and a π/2 phase shift element 13c. The LN modulators 13a, 13b are, in this embodiment, Mach-Zehnder interferometers. The LN modulator 13a is disposed in one of an I arm or a Q arm, and the LN modulator 13b is disposed in the other of the I arm or the Q arm, The π/2 phase shift element 13c gives a phase difference π/2 between the I arm and the Q arm. The π/2 phase shift element 13c is realized with, for example, a material of which optical path length changes in accordance with the voltage or temperature.

The driver circuit 14a drives the LN modulator 13a using a drive signal Data I. The driver circuit 14b drives the LN modulator 13b using a drive signal Data Q. Here, the drive signals Data I, Data Q are generated, for example, by encoding the transmission data X using a DQPSK encoder. The driver circuits 14a, 14b may respectively have an amplifier and control the amplitudes of the drive signals Data I, Data Q. While the output of the driver circuits 14a, 14b is a differential output in FIG. 3, it may be a single output.

Figure 4:
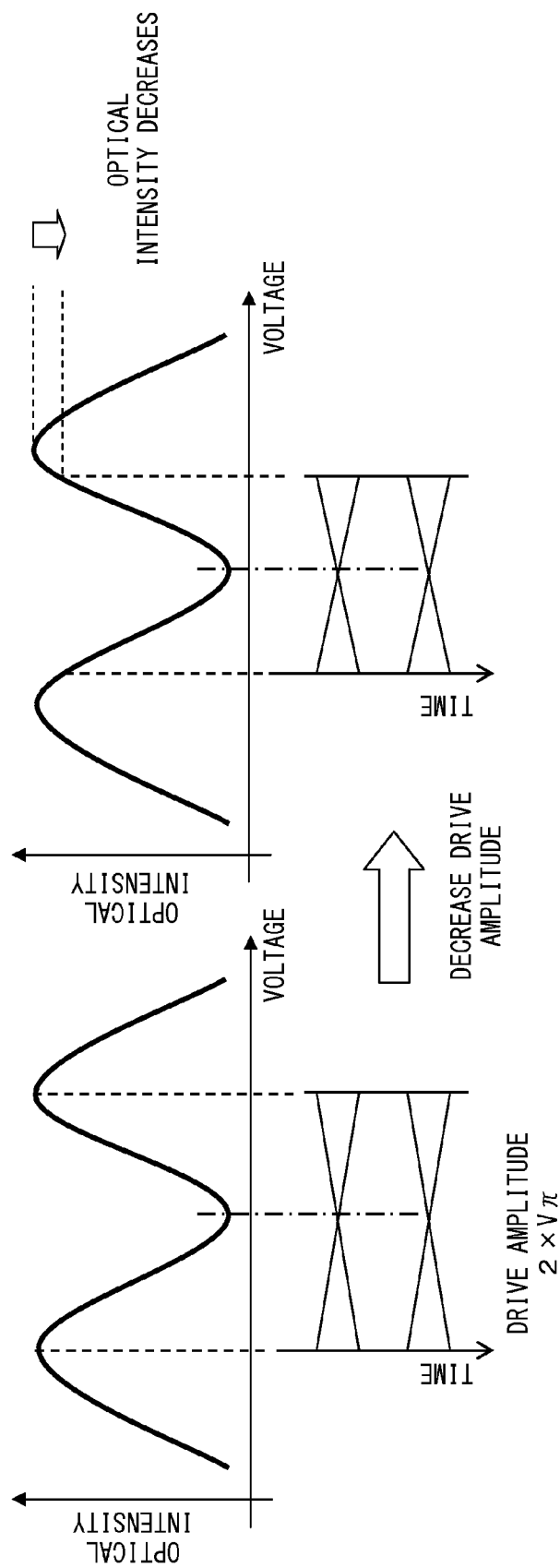
FIG. 4 is a diagram illustrating the operation of an LN modulator.

FIG. 4 is a diagram explaining the operation of the LN modulator. The power of the output light of the LN modulator changes periodically with respect to the driving voltage. Here, the drive amplitude is "2Vπ". Meanwhile, "Vπ" is a half-wavelength voltage, which is a voltage for the power of the output light of the LN modulator to change from a local minimum value to a local maximum value. Therefore, in FIG. 3, a decrease in the amplitude of the drive signal Data I results in a decrease in the amplitude of the output optical signal of the LN modulator 13a, lowering the average power of the output light of the LN modulator 13a. In the same manner, a decrease in the amplitude of the drive signal Data Q lowers the average power of the output light of the LN modulator 13b. The amplitudes of the drive signals Data I, Data Q are controlled, for example, by adjusting the gain of the amplifier provided in the driver circuits 14a, 14b, respectively. In addition, when adopting a fixed-gain amplifier, a similar effect can be obtained by adjusting the amplitude of the input signal to the amplifier. The powers of the output lights of the LN modulators 13a, 13b are controlled to be equal to each other, which is to be described in detail later.

The photodetector 15 converts the output light of the DQPSK optical modulator 13 into an electric signal. In this embodiment, the DQPSK optical modulator 13 outputs a pair of complementary optical signals. Then, one of the pair of optical signals is directed to the polarization beam combiner 31, while the other optical signal is directed to the photodetector 15. Therefore, the electric signal obtained by the photodetector 15 represents the output light of the DQPSK optical modulator 13. As another method for inputting an optical signal to the photodetector 15, a leakage light of the output combiner of the DQPSK optical modulator 13 may be used.

The ABC circuit 11 controls, for example, the drift of the LN modulators 13a, 13b in accordance with the dithering method. In this case, the ABC circuit 11 generates a low-frequency voltage signal. The frequency $f_0$ of the low-frequency voltage signal is sufficiently low with respect to the symbol rate of the transmission data X, Y. The low-frequency voltage signal is given to the LN modulators 13a, 13b. When the low-frequency voltage signal is given to the LN modulator 13a, the output light of the LN modulator 13a includes "$f_0$ component" and/or "$2f_0$ component", and the $f_0$ component and/or the $2f_0$ component are extracted from the output signal of the photodetector 15. Then, the ABC circuit 11 adjusts the DC bias voltage to be applied to the LN modulator 13a, using the extracted frequency components. The same applies to the LN modulator 13b. In addition, the ABC circuit 11 is capable of adjusting the phase shift amount of the π/2 phase shift element 13c in accordance with the dithering method.

Meanwhile, when the operating point of the modulator is shifted by adjusting the DC bias voltage to be applied to the LN modulator 13a, the average power of the output light of the LN modulator 13a changes. Specifically, for example in FIG. 4, when the DC voltage of the drive signal is adjusted, the corresponding output optical signal changes, and thus the average power of the output light also changes. Therefore, the power of the output light of the LN modulator 13a can be controlled by adjusting the DC bias voltage to be applied to the LN modulator 13a.

The configuration and the operation of the modulation unit 20 illustrated in FIGS. 1A and 1B are basically the same as those of the modulation unit 10. That is, the modulation unit 20 has a DQPSK optical modulator 23, driver circuits 24a, 24b, and a photodetector 25. Then, the driver circuits 24a, 24b drive the DQPSK optical modulator 23 in accordance with the transmission data Y.

The optical signal transmitter configured as described above transmits a pair of transmission signals X, Y using a polarization multiplexed optical signal. Specifically, the DQPSK optical modulator 13 is driven in accordance with the transmission data X to generate the modulated optical signal X. In the same manner, the DQPSK optical modulator 23 is driven in accordance with the transmission data Y to generate the modulated optical signal Y. The modulated optical signal X and the modulated optical signal Y are directed to the polarization beam combiner 31. Then, the polarization beam combiner generates the polarization multiplexed optical signal by performing polarization multiplexing of the modulated optical signals X, Y. The polarization multiplexed optical signal is transmitted via an optical fiber transmission path.

At this time, the output lights of the DQPSK optical modulators 13, 23 are respectively converted into electric signals by the photodetectors 15, 25, and given to the computing unit 41 as monitor signals X, Y. The monitor signals X, Y may be the DC components of the output signals of the photodetectors 15, 25. Alternatively, when the computing unit is realized with a processor such as a DSP, the DC components may be obtained by sampling the output of the photodetectors 15, 25. In either case, the computing unit 41 obtains signals representing the average powers of the output lights of the DQPSK optical modulators 13, 23. Hereinafter, it is assumed that the monitor signals X, Y represent the average powers of the output lights of the DQPSK optical modulators 13, 23.

The computing unit 41 calculates the difference between the monitor signals X, Y. Here, the computing unit 41 is realized with, while it is not a particular limitation, for example, a subtractor utilizing a differential amplifier circuit such as the one illustrated in FIG. 5A. In addition, the computing unit 41 may be configured using a comparator such as the one illustrated in FIG. 5B. In this configuration, an averaging circuit is disposed for the output of the comparator. While the averaging circuit is not an essential configuration, the averaging of the output signal of the comparator makes the control by the control unit 42 easy. In addition, when the computing unit 41 is realized with a processor such as a DSP, the monitor signals X, Y are converted into digital data, and digital calculation is performed, The control unit 42 generates a control signal C for making the difference obtained by the computing unit 41 zero. The control signal C is given to, in this example, driver circuits 14a, 14b, 24a, 24b. In other words, the amplitudes of drive signals Data I, Data Q that drive the DQPSK optical modulator 13, and/or the amplitudes of drive signals Data I, Data Q that drive the DQPSK optical modulator 23 are controlled by the control signal C. For example, when the power of the output light of the DQPSK optical modulator 13 is larger than the power of the output light of the DQPSK optical modulator 23, the control unit 42 generates a control signal C for decreasing the amplitudes of the drive signals Data I, Data Q that drive the DQPSK optical modulator 13 (or, for increasing the amplitudes of the drive signals Data I, Data Q that drive the DQPSK optical modulator 23). This feedback control makes the powers of the output lights of the DQPSK optical modulators 13, 23 approximately equal to each other. In other words, the optical powers of the X polarized wave and the Y polarized wave of the polarization multiplexed optical signal become approximately equal to each other.

While monitor signals X, Y are generated using the photodetectors 15, 25 in the configuration illustrated in FIG. 3, the monitor signals X, Y may be generated in accordance with the configuration illustrated in FIG. 1B. In other words, the modulated optical signals X, Y directed to the polarization beam combiner 31 may be split off, and the monitor signals X, Y may be generated from the split-off portions. However, in the configuration illustrated in FIG. 3, the monitor signals X. Y can be obtained using the photodetectors 15, 25 for the ABC circuits 11, 21, contributing to cost reduction.

In addition, while the amplitude of the drive signals driving the DQPSK optical modulators 13, 23 are controlled in the configuration illustrated in FIG. 3, other elements may be controlled. In other words, for example, the bias of the DQPSK optical modulators 13, 23 may be controlled. In this case, the control signal C is given to the ABC circuits 11, 21. Then, the ABC circuits 11, 21 control, as explained with reference to FIG. 4, the DC bias voltage in accordance with the control signal C. Alternatively, in the configuration such as the one illustrated in FIG. 1A or 1B in which optical attenuators 12, 22 are provided, each optical attenuator may be controlled in accordance with the control signal C. In this case, the monitor signals X, Y may be generated using the optical signal split off on the output side of the optical attenuator.

FIG. 6 illustrates the second embodiment of the optical signal transmitter. The optical signal transmitter according to the second embodiment has an RZ optical modulator on the input side or on the output side of the DQPSK optical modulator. In the example illustrated in FIG. 6, RZ optical modulators 51, 61 are disposed on the output side of the DQPSK optical modulators 13, 23, respectively. That is, in the second embodiment, data are transmitted in accordance with the RZ-DQPSK modulation.

The RZ optical modulators 51, 61 are, for example, Mach-Zehnder LN modulators, which perform RZ modulation in accordance with drive signals generated by driver circuits 52, 62. Here, the drive circuits 52, 62 generate drive signals synchronized with a symbol clock. The drive signal is, while it is not a particular limitation, a sine wave having the same frequency as the symbol clock. In addition, the amplitude of the drive signal is, for example, Vπ.

The ABC circuit 11 controls, not only the drift of the DQPSK optical modulator 13 but also the drift of the RZ optical modulator 51. In the same manner, the ABC circuit 21 controls, not only the drift of the DQPSK optical modulator 23, but also the drift of the RZ optical modulator 61. Meanwhile, the configuration and the operation of the computing unit 41 and the control unit 42 are similar to those in the first embodiment.

In the optical signal transmitter configured as described above, the control signal C generated by the control unit 42 is given to driver circuits 14a, 14b, 24a, 24b. That is, feedback control is performed for the amplitude of at least on of the drive signals driving the DQPSK optical modulators 13, 23.

Figure 7:
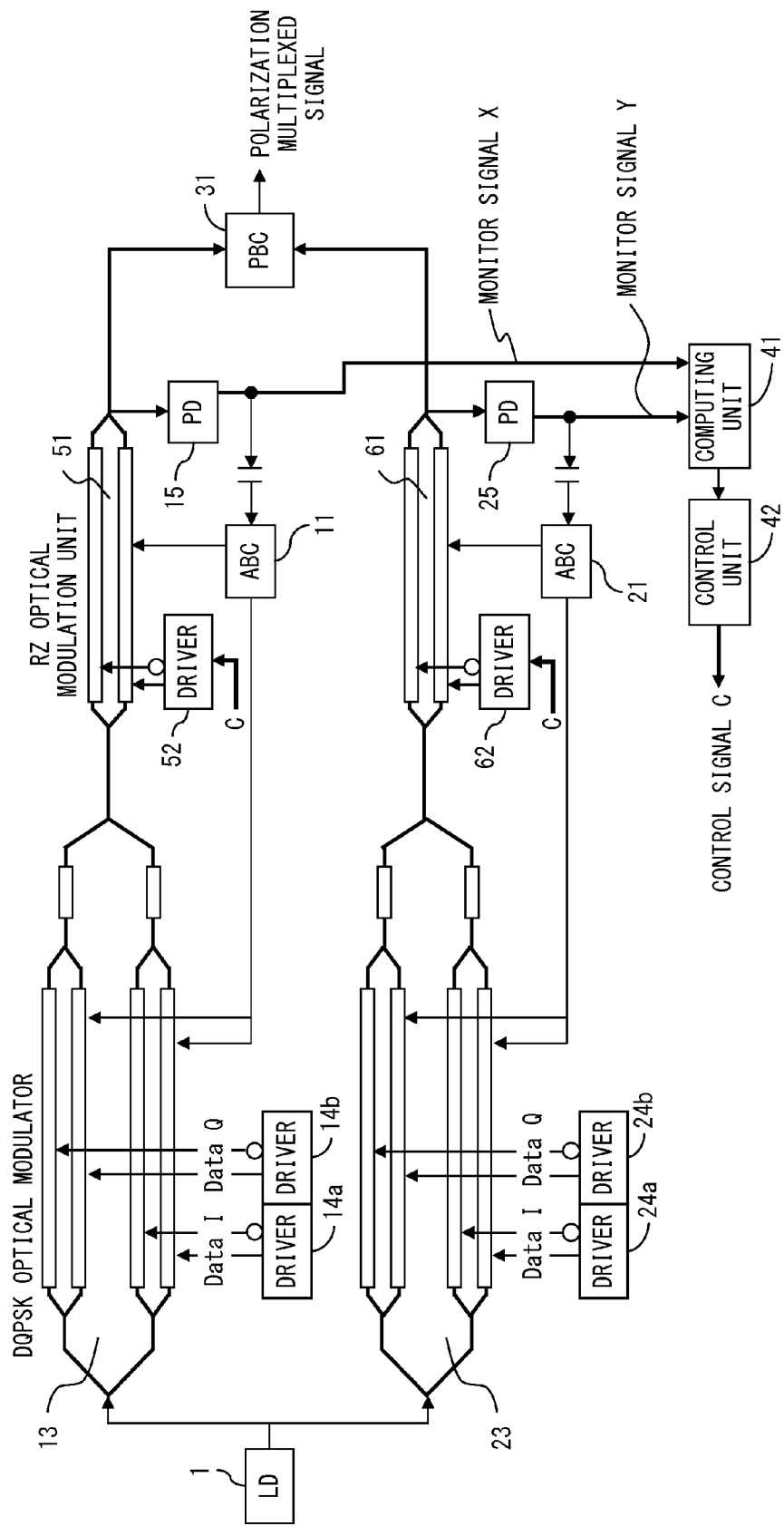
FIG. 7 illustrates the third embodiment of an optical signal transmitter.

FIG. 7 illustrates the third embodiment of the optical signal transmitter. In the third embodiment, the control signal C generated by the control unit 42 is given to driver circuits 52, 62 driving RZ optical modulators 51, 61. The driver circuits 52, 62 generate, as described above, a drive signal synchronized with a symbol clock.

FIG. 8 is a diagram explaining the operation of an LN modulator used as the RZ optical modulators 51, 61. In the LN modulator, when it is used as the RZ optical modulators 51, 61, the amplitude of the drive signal is, for example, Vπ. Here, a decrease in the amplitude of the drive signal results in a decrease in the average power of the output light of the LN modulator. That is, the control of the drivers 52, 62 using the control signal C to control the amplitude of the drive signal of the RZ optical modulators 51, 52 results in a change in the average power of the output light of the RZ optical modulators 51, 61. Therefore, for example, when the power of the output light of the RZ optical modulator 51 is larger than the power of the output light of the RZ optical modulator 61, the control unit 42 generates a control signal C for decreasing the amplitude of the drive signal driving the RZ optical modulator 51 (or, for increasing the amplitude of the drive signal driving the RZ optical modulator 61). The feedback control makes the powers of the output lights of the RZ optical modulators 51, 61 approximately equal to each other. That is, the optical powers of the X polarized wave and the Y polarized wave of the polarization multiplexed optical signal become approximately equal to each other.

Figure 9:
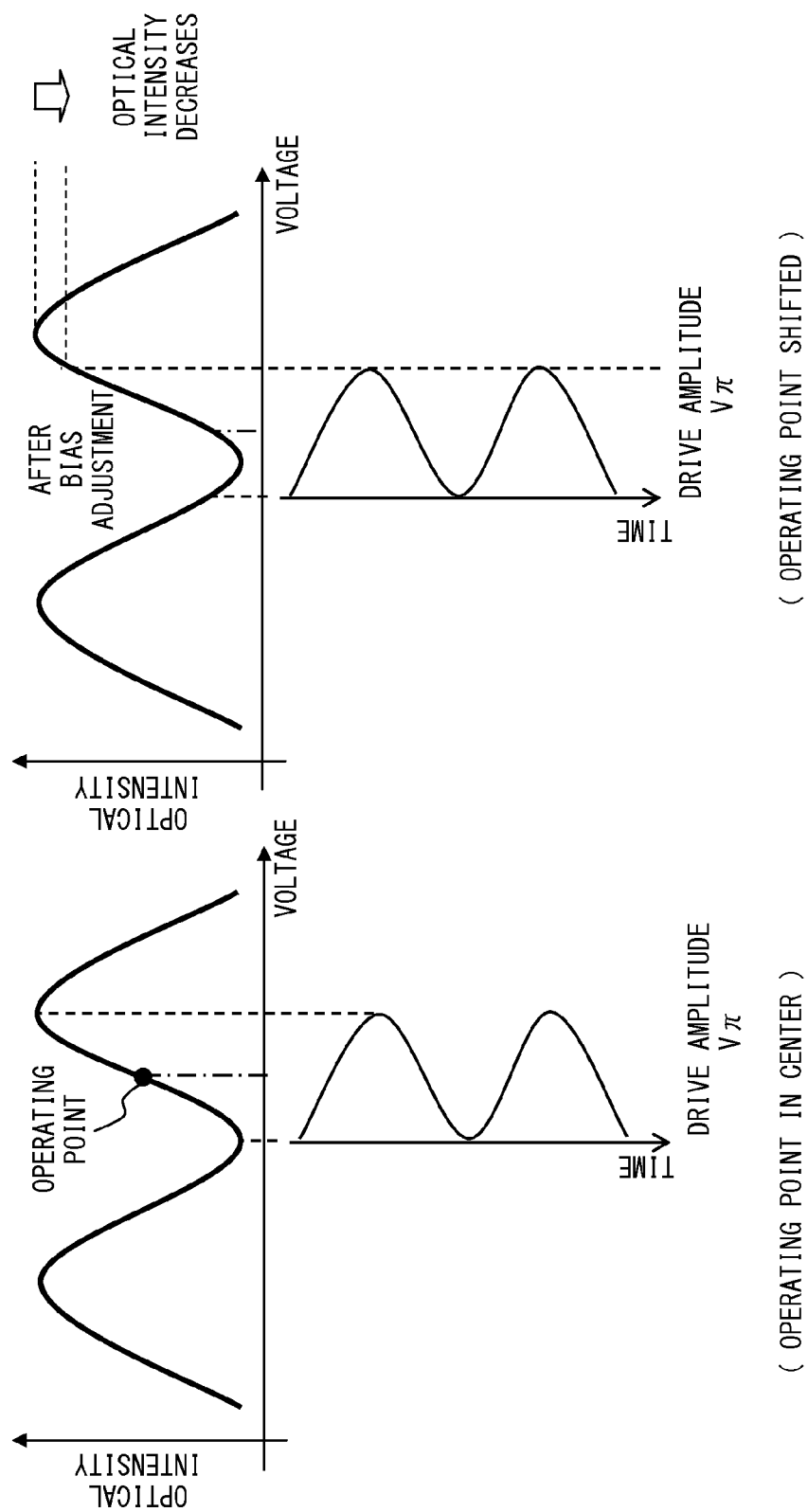
FIG. 9 is a diagram illustrating the bias of an LN modulator.

FIG. 9 is a diagram explaining the bias of the LN modulator used as the RZ optical modulators 51, 61. Here, the state in which the operating point is adjusted to the center and the state in which the operating point is shifted from the center are illustrated. In this case, as illustrated in FIG. 9, if the operating point is shifted from the center, the average power of the output light of the LN modulator decreases. In other words, the average power of the output light is controlled by adjusting the DC bias voltage applied to the LN modulator. Therefore, the control unit 42 is able to make the optical powers of the X polarized wave and the Y polarized wave of the polarization multiplexed optical signal approximately equal to each other by adjusting the DC bias voltage, utilizing this characteristic of the LN optical modulator.

FIG. 10 illustrates the fourth embodiment of the optical signal transmitter. In the fourth embodiment, the control signal C generated by control unit 42 is given to ABC circuits 11, 21. At this time, the ABC circuits 11, 21 control the DC bias voltage of the RZ optical modulators 51, 61 in accordance with the control signal C. The relationship between the DC bias voltage and the power of the output light of the LN modulator is as described with reference to FIG. 9.

Figure 11:
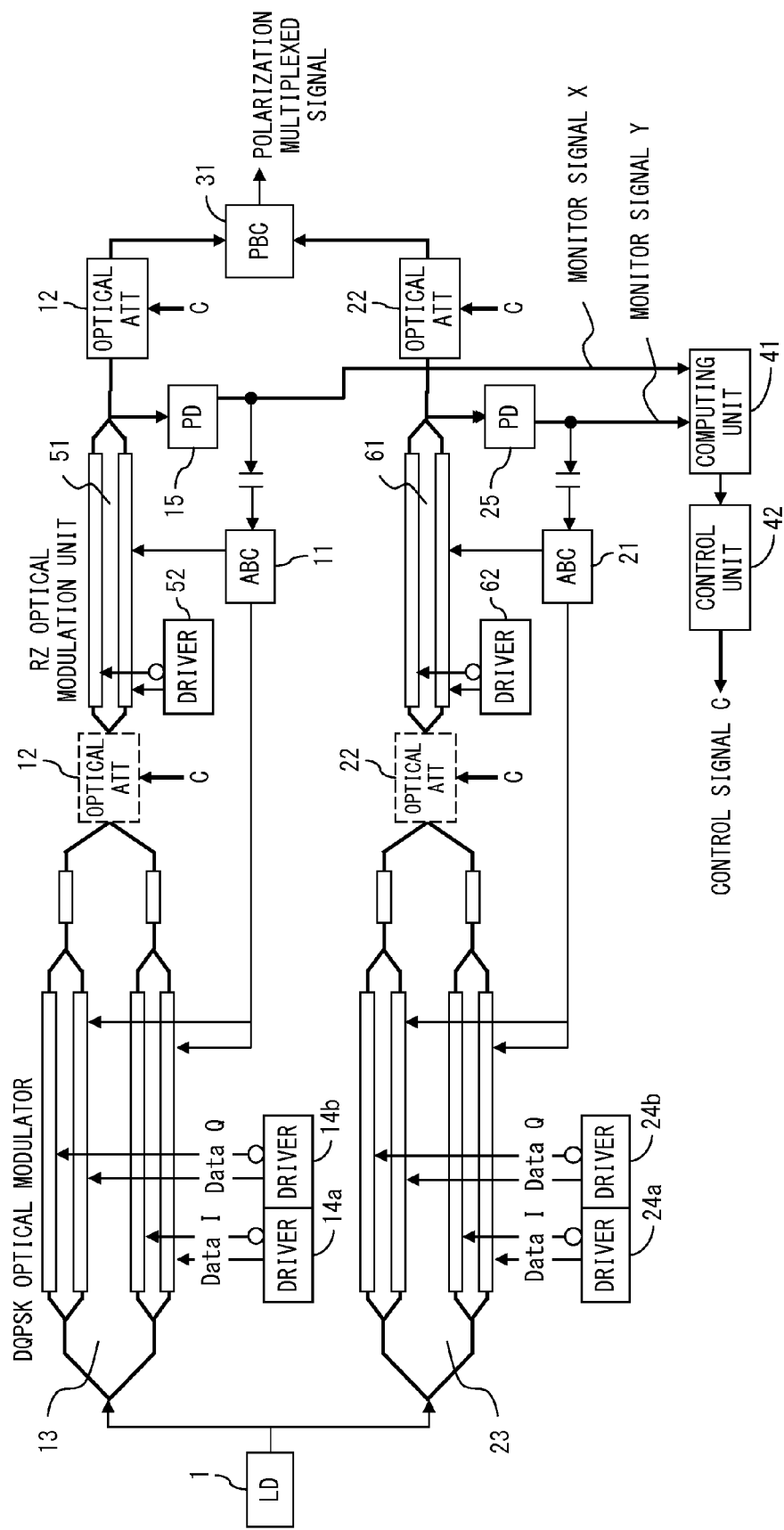
FIG. 11 illustrates the fifth embodiment of an optical signal transmitter.

FIG. 11 illustrates the fifth embodiment of the optical signal transmitter. In the fifth embodiment, optical attenuators 12, 22 are provided to adjust the power of each of the modulated optical signals. The optical attenuators 12, 22 may be disposed between the DQPSK optical modulators 13, 23 and the RZ optical modulators 51, 61, or may be disposed on the output side of the RZ optical modulators 51, 61. In addition, the optical attenuators may be disposed respectively between the LD1 and the DQPSK optical modulator 13, and between the LD1 and the DQPSK optical modulator 23.

The control signal C generated by the control unit 42 is given to the optical attenuators 12, 22. The optical attenuators 12, 22 adjust the power of the modulated optical signal in accordance with the control signal C. When the optical attenuators 12, 22 are disposed on the output side of the RZ optical modulators 51, 61, the monitor signals X, Y are generated from the optical signal split off on the output side of the optical attenuators 12, 22.

Figure 12A:
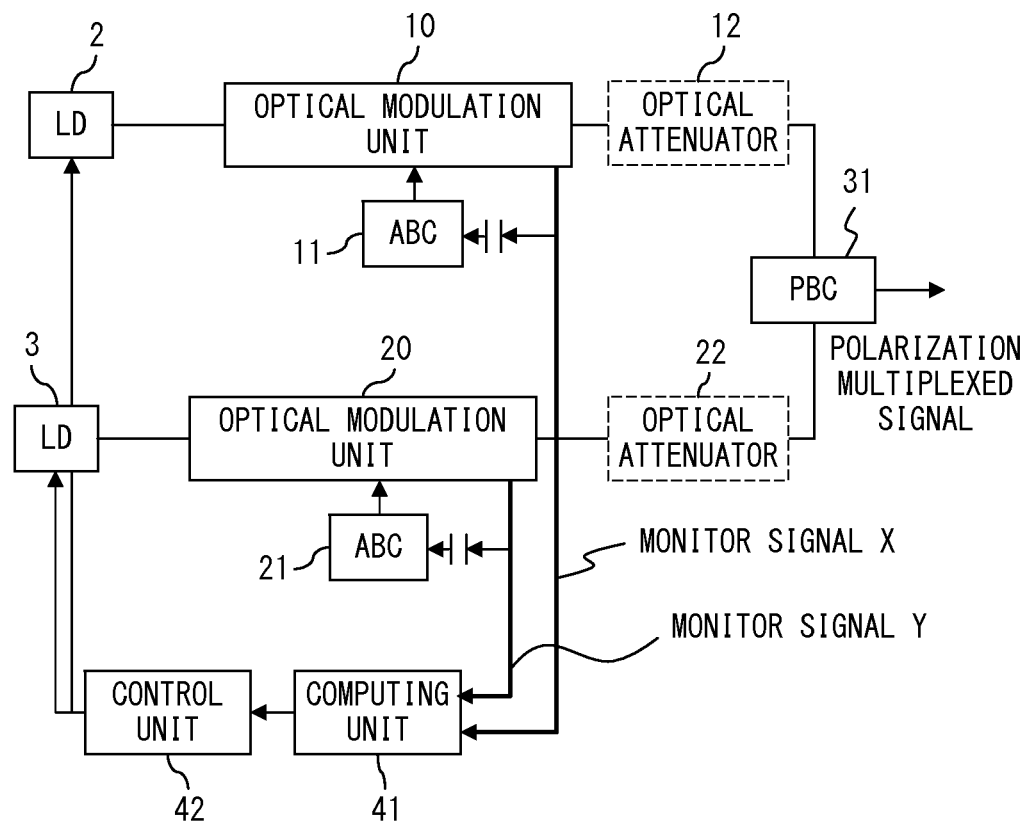

FIGS. 12A and 12B are diagrams illustrating modification examples of the first aspect. The configurations illustrated in FIG. 12A and FIG. 12B correspond to the optical signal transmitters illustrated in FIG. 1A and FIG. 1B, respectively.

In the optical signal transmitters illustrated in FIG. 12A and FIG. 12B, light sources 2, 3 are provided for the modulation units 10, 20, respectively. The modulation unit 10 generates a modulated optical signal X using the output light of the light source 2, and the modulation unit 20 generates a modulated optical signal Y using the output light of the light source 3.

In the optical transmitter configured as described above, the control signal C generated by the control unit 42 is given to the light sources 2, 3. Then, the light sources 2, 3 controls the light-emitting power, making it possible to make the optical powers of the X polarized wave and the Y polarized wave of the polarization multiplexed optical signal approximately equal to each other.

Figure 13:
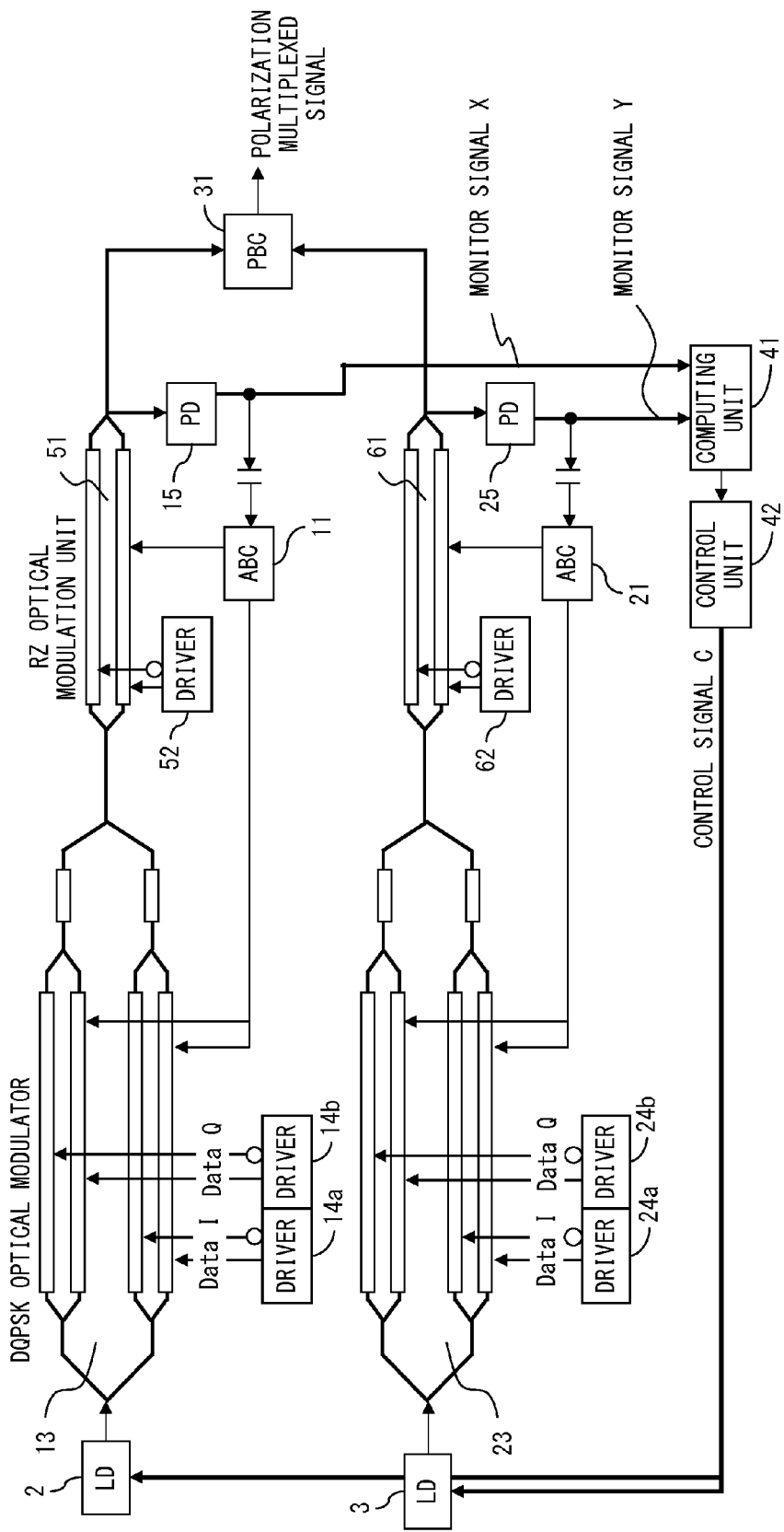
FIG. 13 illustrates the sixth embodiment of an optical signal transmitter.

FIG. 13 illustrates the sixth embodiment of the optical signal transmitter. In the sixth embodiment, the light-emitting power of the light sources 2, 3 are adjusted in accordance with the control signal C generated by the control unit 42. For example, when the power of the output light of the RZ optical modulator 51 is larger than the power of the output light of the RZ optical modulator 61, the control unit 42 generates a control signal C for decreasing the light-emitting power of the light source 2 (or, for increasing the light-emitting power of the light source 3). The feedback control makes the output optical powers of the modulated optical signals X, Y approximately equal to each other.

Figure 14:
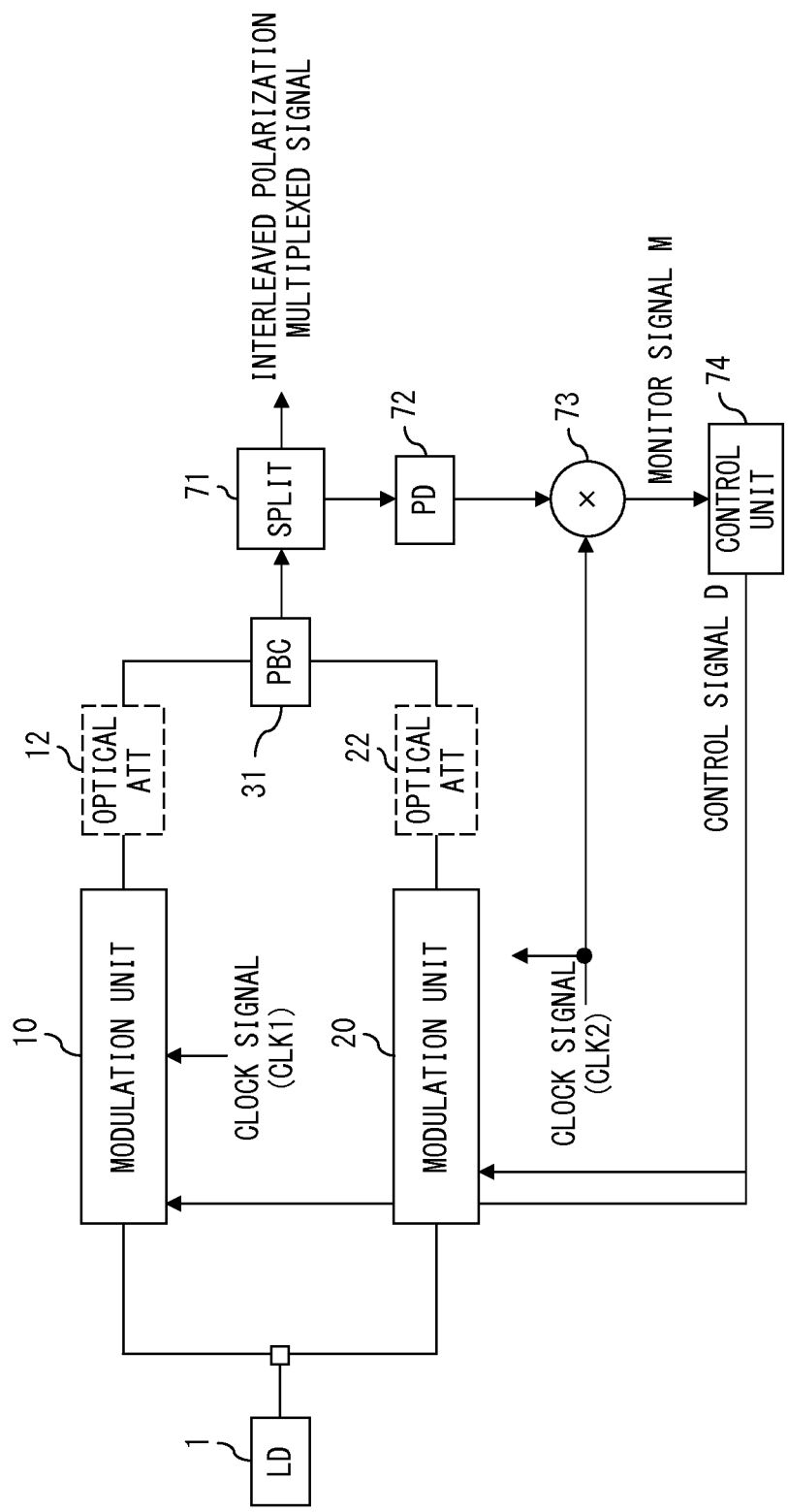
FIG. 14 is a diagram illustrating the configuration of an optical signal transmitter according to the second aspect.
Figure 16A:
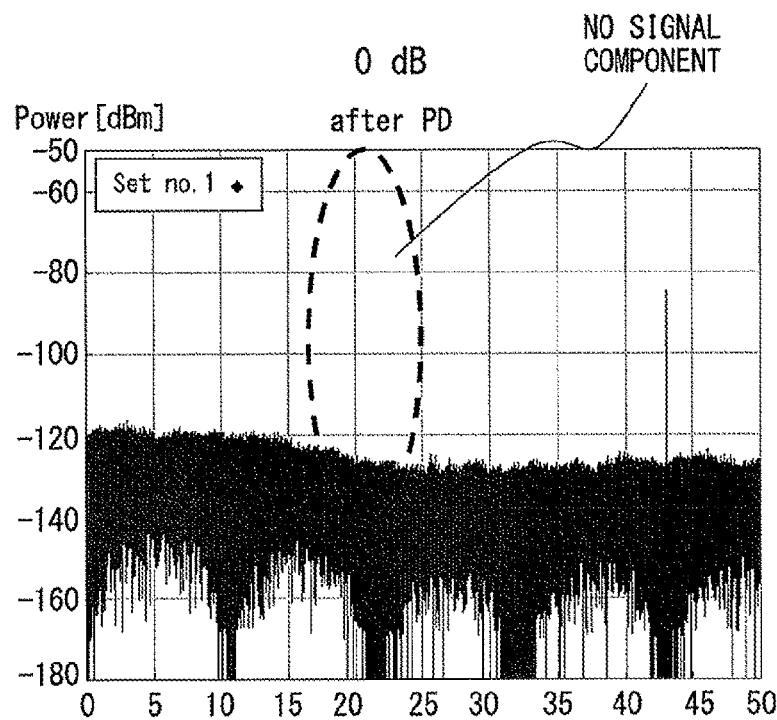
FIGS. 16A-16D are graphs of power versus frequency illustrating the spectrum of an output signal of a photodetector for optical power differences of 0 dB, 01 dB, 0.5 dB and 1 dB, respectively.
Figure 16B:
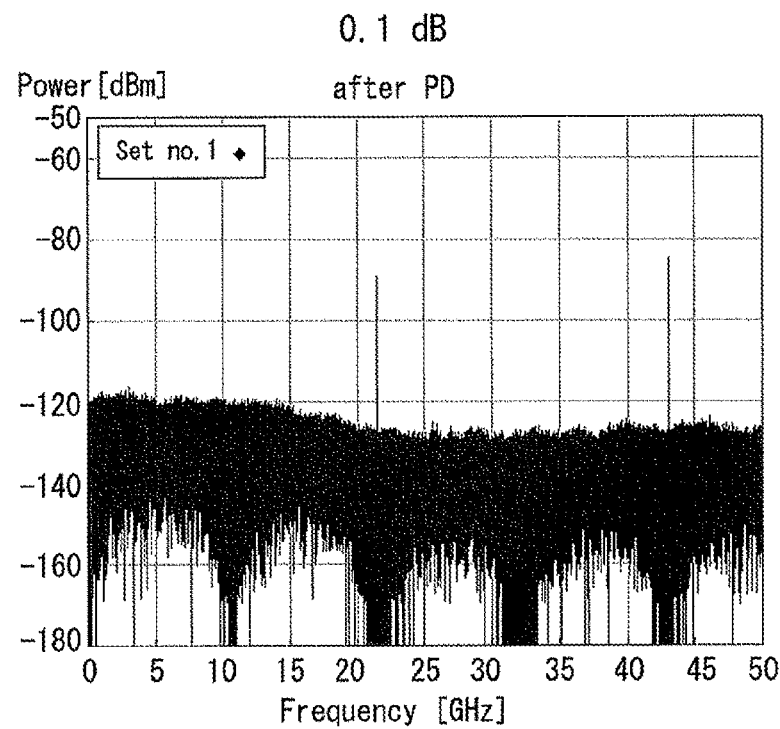
Figure 16C:
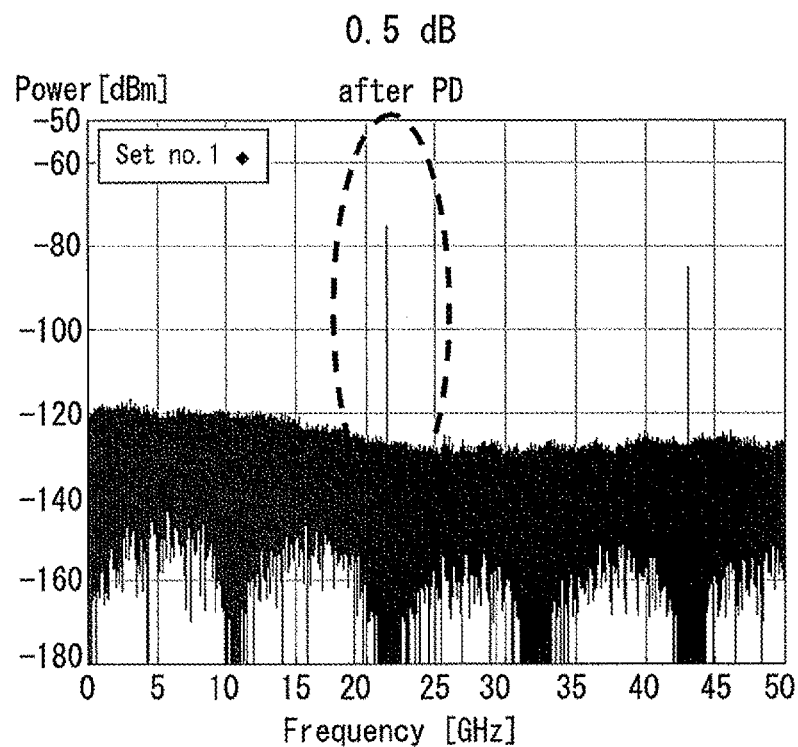
Figure 16D:
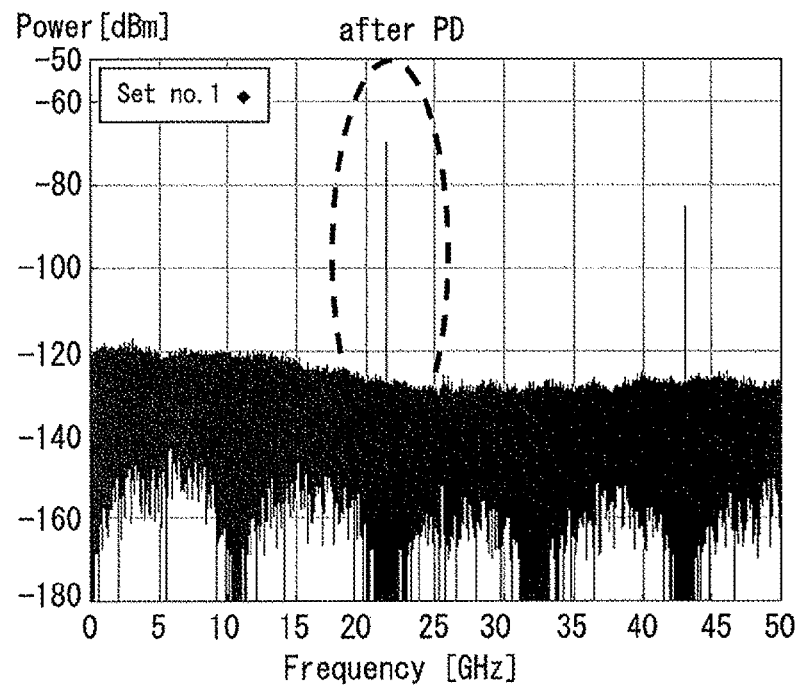

FIG. 14 is a diagram illustrating the configuration of the optical signal transmitter according to the second aspect. In the optical signal transmitter according to the second aspect, a signal is transmitted using Time-Interleaved Polarization Multiplex.

FIGS. 15A and 15B are diagrams illustrating Time-Interleaved Polarization Multiplex. In a general (aligned) polarization multiplexing, as illustrated in FIG. 15A, the pulses of the X polarized wave and the Y polarized wave are transmitted at the same timing. On the other hand, according to the Time-Interleaved Polarization Multiplex, as illustrated in FIG. 15B, the pulses of the X polarized wave and the Y polarized wave are transmitted in the state where they are shifted by time Δt with respect to each other. The shift time Δt corresponds to, for example, one fourth of the symbol period.

In an optical signal transmitter according to the Time-Interleaved Polarization Multiplex system, the operation timings of the modulators 10, 20 are shifted with respect to each other by one-fourth period of the symbol clock, in order to realize the shift time Δt. In the configuration illustrated in FIG. 14, the modulator 10 operates in synchronization with a clock signal CLK1, and the modulator 20 operates in synchronization with a clock signal CLK2. The frequency of the clock signals CLK1, CLK2 is the same, and corresponds to the symbol rate.

The Time-Interleaved Polarization Multiplex makes it possible to suppress the degradation of transmission quality due to non-linear noises in the optical fiber. The Time-Interleaved Polarization Multiplex is described, for example, D. Van Den Borne, et. al., "1.6-b/s/Hz Spectrally Efficient Transmission Over 1700 Km of SSMF Using 40×85.6-Gb/s POLMUX-RZ-DQPSK", J. Lightwave Technology., Vol. 25, No. 1, January 2007

The optical signal transmitter according to the second aspect has, as illustrated in FIG. 14, an optical splitter 71, a photodetector (PD) 72, a mixer 73, and a control unit 74. The optical splitter 71 splits off an interleaved polarization multiplexed optical signal output from the polarization beam combiner 31. The photodetector 72 is, for example, a photodiode, and converts the split-off interleaved polarization multiplexed optical signal into an electric signal. The mixer 73 multiplexes an output signal of the photodetector 72 and the clock signal CLK2 to generate a monitor signal M. The control unit 74 generates a control signal D in accordance with the monitor signal M. In this regard, the optical splitter 71 may be integrated with the polarization beam combiner 31.

FIGS. 16A-16D are graphs illustrating the spectrum of an output signal of the photodetector 72 for optical power differences of 0 dB, 01 dB, 0.5 dB and 1 dB, respectively. The spectrum is a result of the simulation for changing the optical power difference between the modulated optical signals X, Y. The symbol rate is 21.5 G. The modulated optical signals X, Y are RZ-DQPSK optical signals.

When the optical powers of the modulated optical signals X, Y are different from each other, the peak of the optical power appears at the frequency corresponding to the symbol rate. In the example illustrated in FIG. 16, when the optical powers of the modulated optical signals X, Y are different from each other only by 0.1 dB, the peak of the optical power appears at 21.5 GHz. In addition, as the difference between optical powers of the modulated optical signals X, Y increase, the optical power at 21.5 GHz also increases.

On the other hand, when the optical powers of the modulated optical signals X, Y are the same, the peak of the optical power does not appear at the frequency corresponding to the symbol rate. Therefore, the optical power of the modulated optical signals X, Y become equal to each other, when the optical power is monitored at the frequency corresponding to the symbol rate and feedback control is performed so as to make the monitored optical power minimum.

Therefore, in the second aspect, a frequency component fs corresponding to the symbol rate is extracted from an output signal of the photodetector 72. In the example illustrated in FIG. 14, the frequency component fs is extracted from an output signal of the photodetector 72 by multiplexing the output signal of the photodetector 72 with the clock signal CLK2 using the mixer 73. Then, the signal extracted by the mixer 73, or a signal representing the power of the frequency component fs is given to the control unit 74 as a monitor signal M. Meanwhile, the frequency component fs may be extracted using a bandpass filter. In this case, the frequency component fs can be extracted without using the clock signal CLK2.

The control unit 74 generates a control signal D to minimize the monitor signal M. The control signal D controls, for example, the amplitude of at least one of the drive signals of the modulation units 10, 20. Alternatively, the control signal D may control the bias of the LN modulator provided in at least one of the modulation units 10, 20. Furthermore, in a configuration in which the optical attenuators 12, 22 are provided, the control signal D may control the attenuation amount of at least one of the optical attenuators 10, 20. In either case, a feedback system for minimizing the monitor signal M (that is, for minimizing the frequency component fs) is formed. Meanwhile, the optical attenuators 12, 22 may be disposed between the LD1 and the modulators 10, 20, respectively.

The configuration descried above makes it possible to make the powers of the modulated optical signals X, Y approximately equal to each other, in the second aspect as well. That is, the powers of the X polarized wave and the Y polarized wave of the polarization multiplexed optical signal can be approximately equal to each other. Therefore, the transmission characteristics of the polarization multiplexed optical signal are improved. In addition, as illustrated in FIG. 16, since the spectrum changes significantly with respect to a slight difference (in the embodiment, only by 0.1 dB) between the optical powers of the modulated optical signals X, Y, an optical power adjustment with a high accuracy can be performed.

Figure 17:
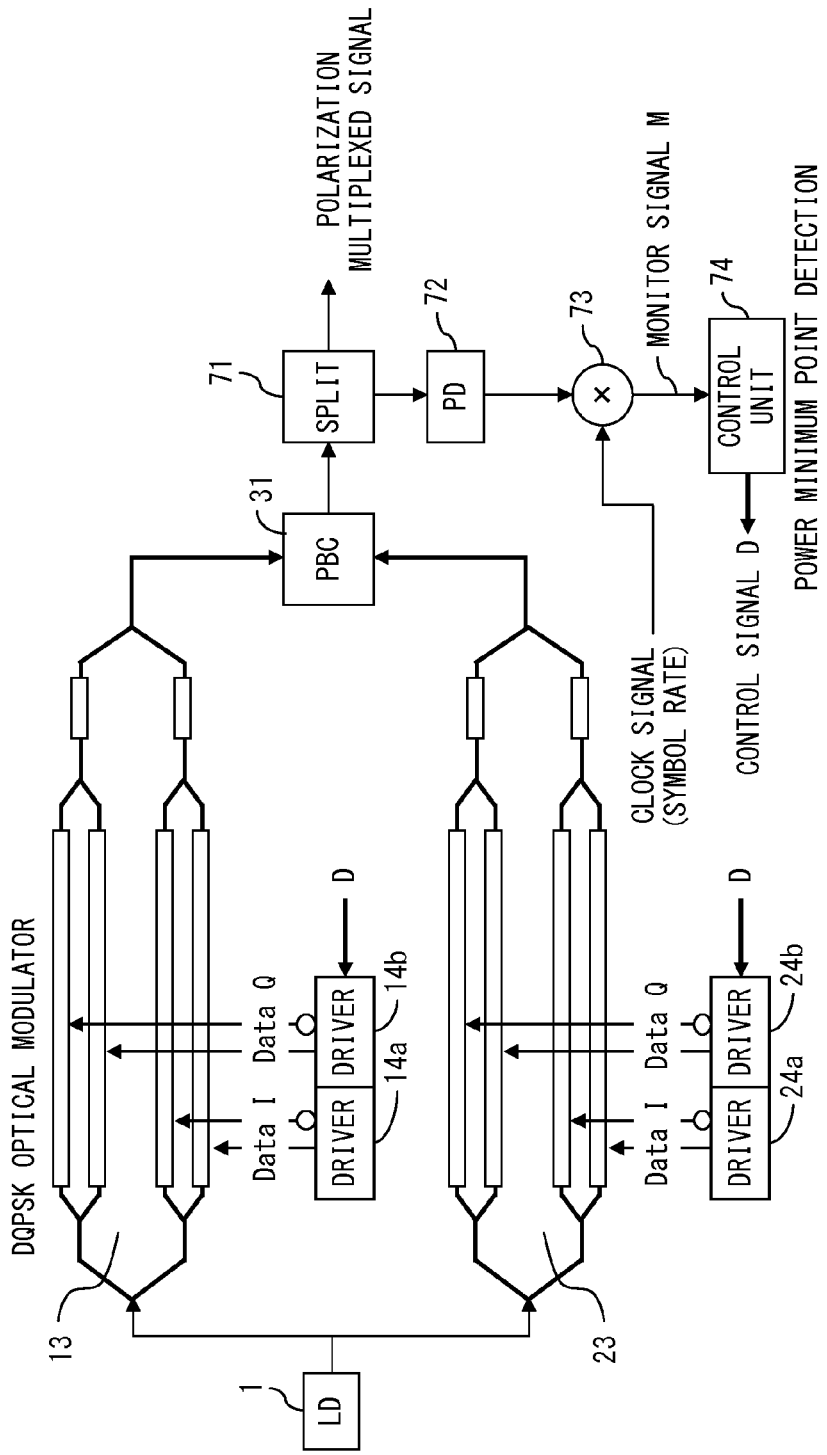
FIG. 17 illustrates the seventh embodiment of an optical signal transmitter.
Figure 18:
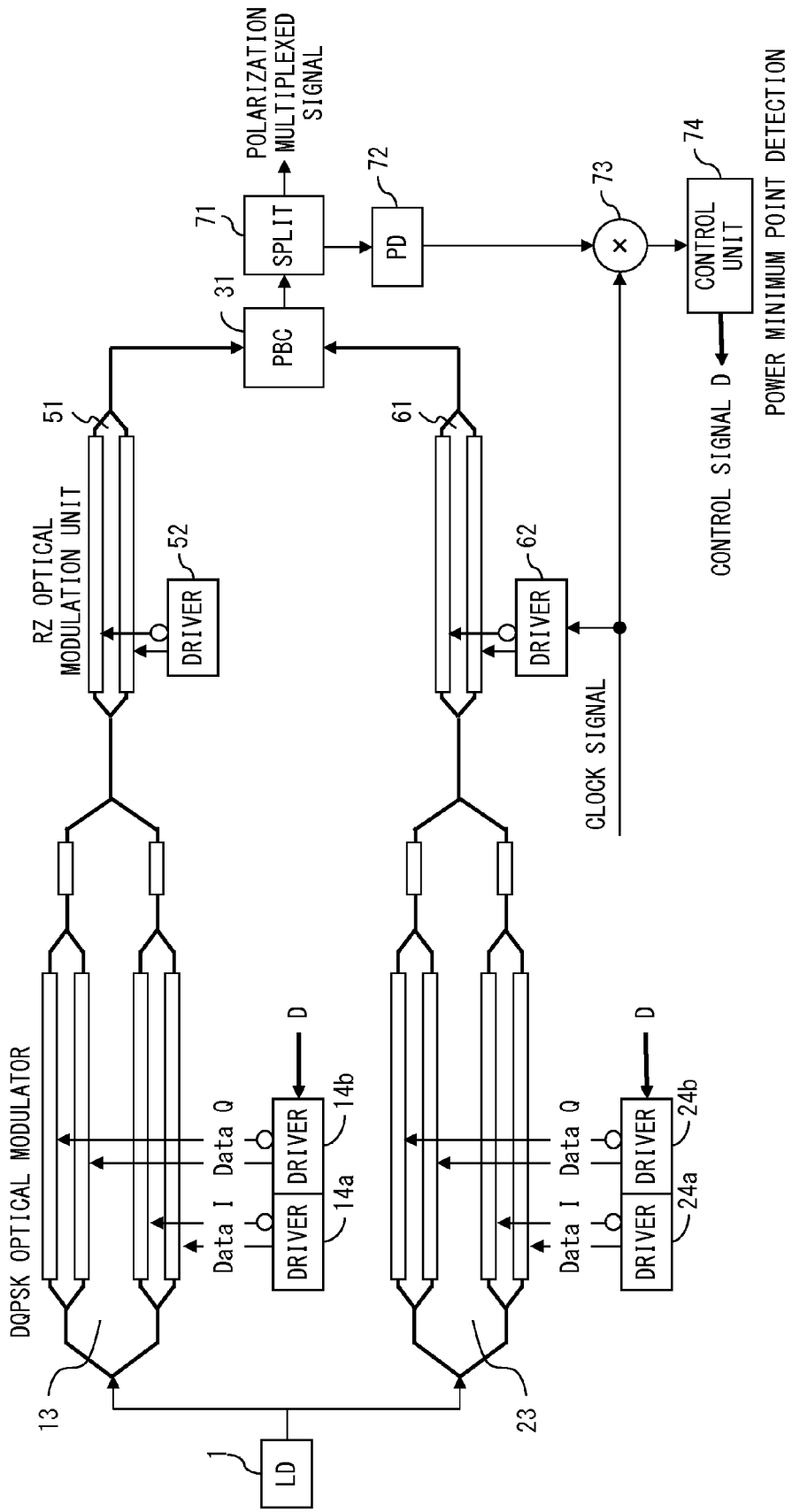
FIG. 18 illustrates the eighth embodiment of an optical signal transmitter.
Figure 20:
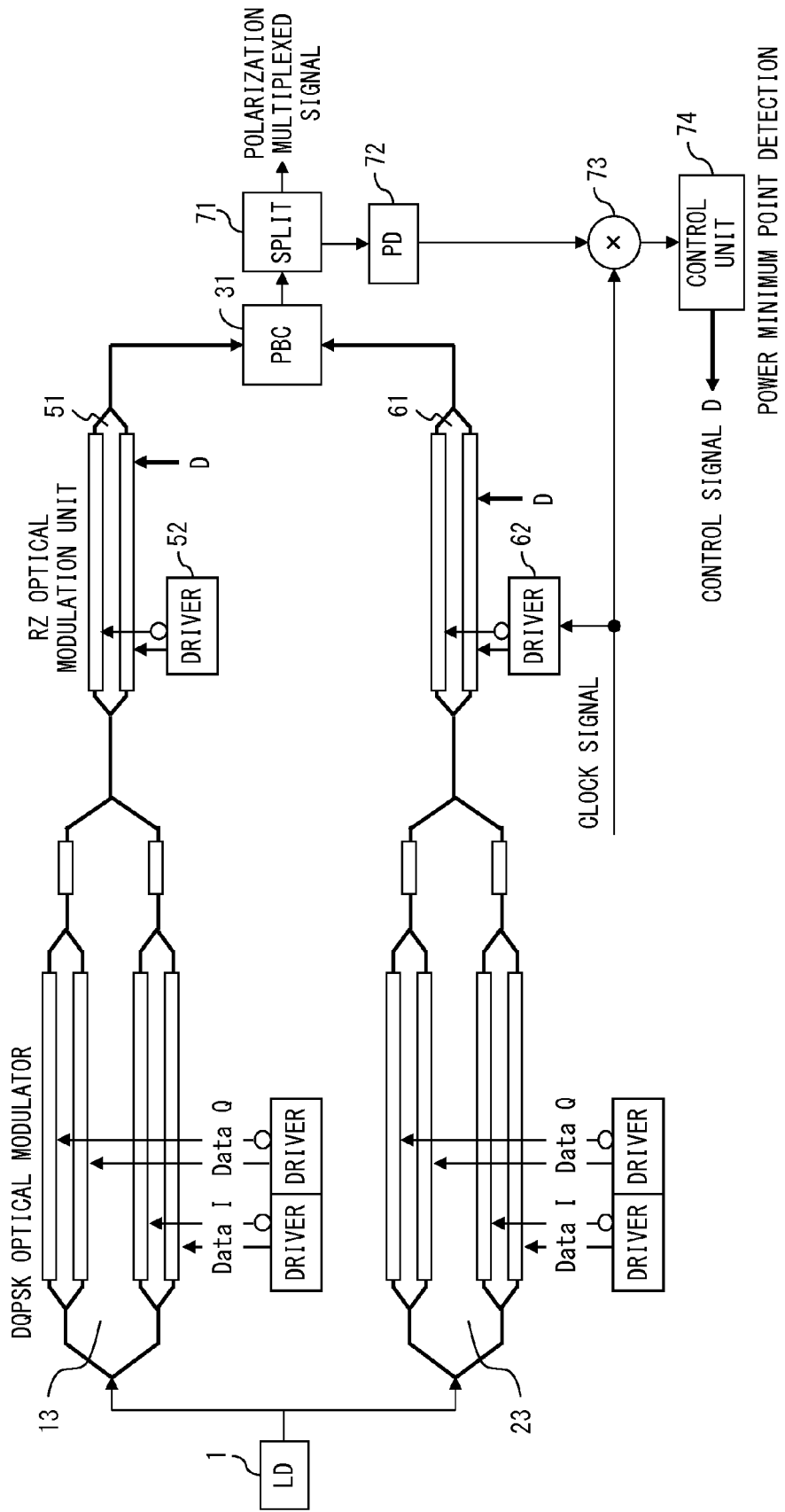
FIG. 20 illustrates the tenth embodiment of an optical signal transmitter.

FIG. 17 illustrates the seventh embodiment of the optical signal transmitter. The configuration of the seventh embodiment is basically the same as that of the first embodiment. However, the feedback system of the seventh embodiment is different from that of the first embodiment.

In the optical signal transmitter according to the seventh embodiment, as explained with reference to FIG. 14, the amplitude of the drive signal of the DQPSK optical modulators 13, 23 is controlled so as to minimize the monitor signal M. However, in this embodiment, which one of the output lights of the DQPSK optical modulators 13, 23 has a larger power is not necessarily detected. For this reason, in the feedback control using the control signal D, the following procedures are performed, for example. Here, it is assumed that a monitor signal M1 is detected.

When the monitor signal M1 is smaller than a threshold level, it is determined that the power difference between the modulated optical signals X, Y is sufficiently small. In this case, the amplitude of the drive signals of the DQPSK optical modulators 13, 23 are maintained. When the monitor signal M1 is larger than the threshold level, a control signal D for decreasing the amplitude of the drive signal of the DQPSK optical modulator 13 is generated, and a monitor signal M2 is detected. If the monitor signal M2 is smaller than the monitor signal M1, it is determined that the control direction is correct, and after that, the control signal D for decreasing the amplitude of the drive signal of the DQPSK optical modulator 13 is generated until the monitor signal becomes smaller than the threshold level. On the other hand, if the monitor signal M2 is larger than the monitor signal M1, it is determined that the control direction is wrong, and a control signal D for decreasing the amplitude of the drive signal of the DQPSK optical modulator 23 is generated until the monitor signal becomes smaller than the threshold level.

While the amplitude of the drive signal driving the DQPSK optical modulators 13, 23 is controlled in the configuration illustrated in FIG. 17, other elements may be controlled. In other words, the bias of the DQPSK optical modulators 13, 23 may be controlled. In this case, the control signal D is given to the ABC circuits 11, 21. Then, the ABC circuits 11, 21 control, as explained with reference to FIG. 4, the DC bias voltage in accordance with the control signal D. Alternatively, in an embodiment such as the one illustrated in FIG. 14 in which the optical attenuators 12, 22 are provided, each attenuator may be controlled in accordance with the control signal D.

FIG. 18 through FIG. 21 illustrates the eighth through eleventh embodiments. The configuration of the eighth through eleventh embodiments is similar to that of the second through fifth embodiments. However, the feedback system of the eighth through eleventh embodiments adopts the configuration described with reference to FIG. 14.

FIG. 22 is a diagram illustrating a modification example of the second aspect. In the optical signal transmitter illustrated in FIG. 22, light sources 2, 3 are provided for the modulation units 10, 20, respectively, in the same manner as in the configuration illustrated in FIG. 12A, FIG. 12B. The modulation unit 10 generates a modulated optical signal X using output light of the light source 2, and the modulation unit 20 generates a modulated optical signal Y using output light of the light source 3. Here, the optical attenuators 12, 22 may be disposed either on the input side or on the output side of the modulation units 10, 20.

In the optical signal transmitter configured as described above, the control signal D generated by the control unit 74 is given to at least one of the light sources 2, 3. Then, the light sources 2, 3 control the light-emitting power in accordance with the control signal D. This makes it possible to make the optical powers of the X polarized wave and the Y polarized wave of the polarization multiplexed optical signal approximately equal to each other.

Figure 23:
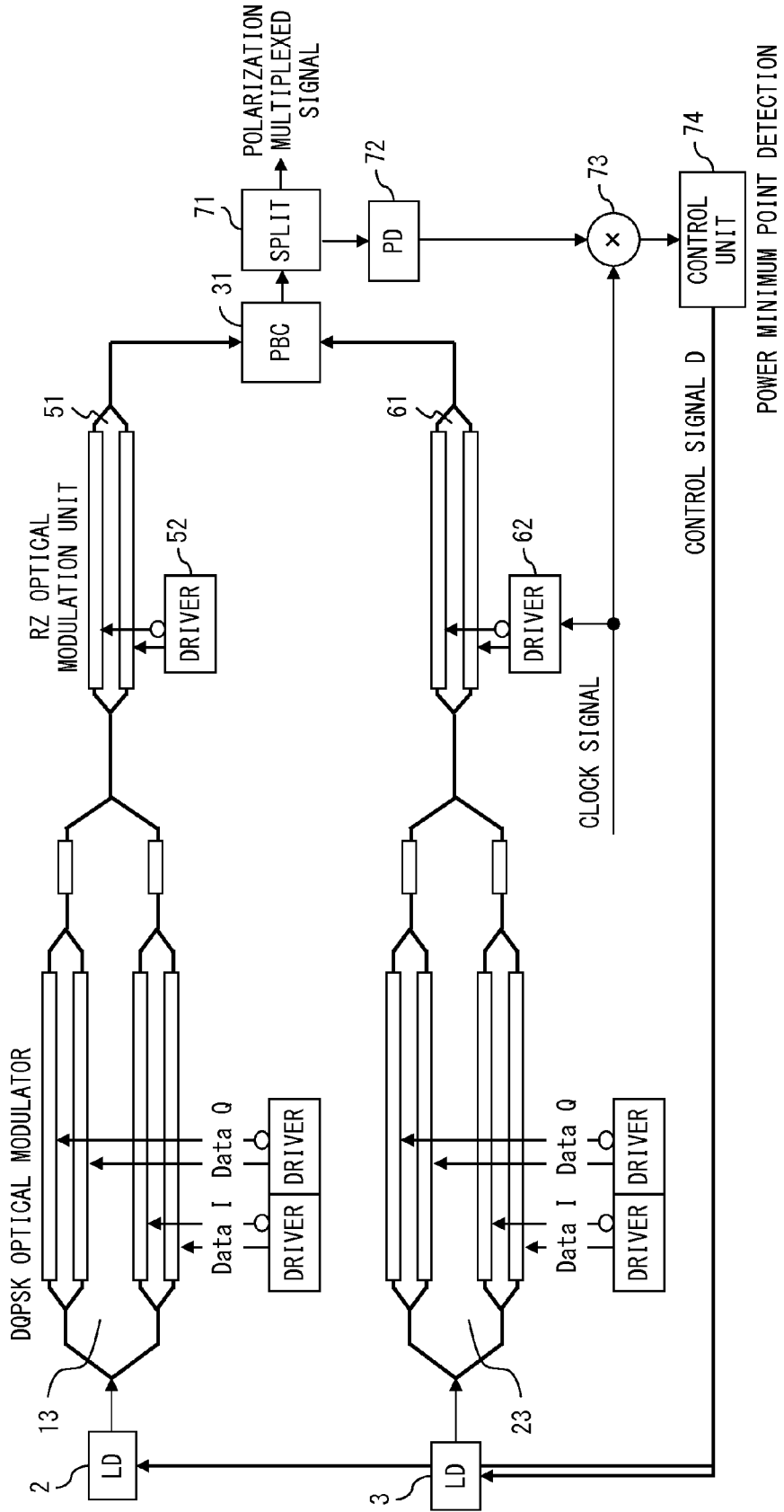
FIG. 23 illustrates the twelfth embodiment of an optical signal transmitter.

FIG. 23 illustrates the twelfth embodiment of the optical signal transmitter. The configuration of the twelfth embodiment is similar to that of the sixth embodiment. However, the feedback system of the twelfth embodiment adopts the configuration described with reference to FIG. 14.

In the third embodiment, a plurality of subcarriers with different frequencies are generated, and a plurality of data sets are transmitted with each subcarrier.

Figure 24:
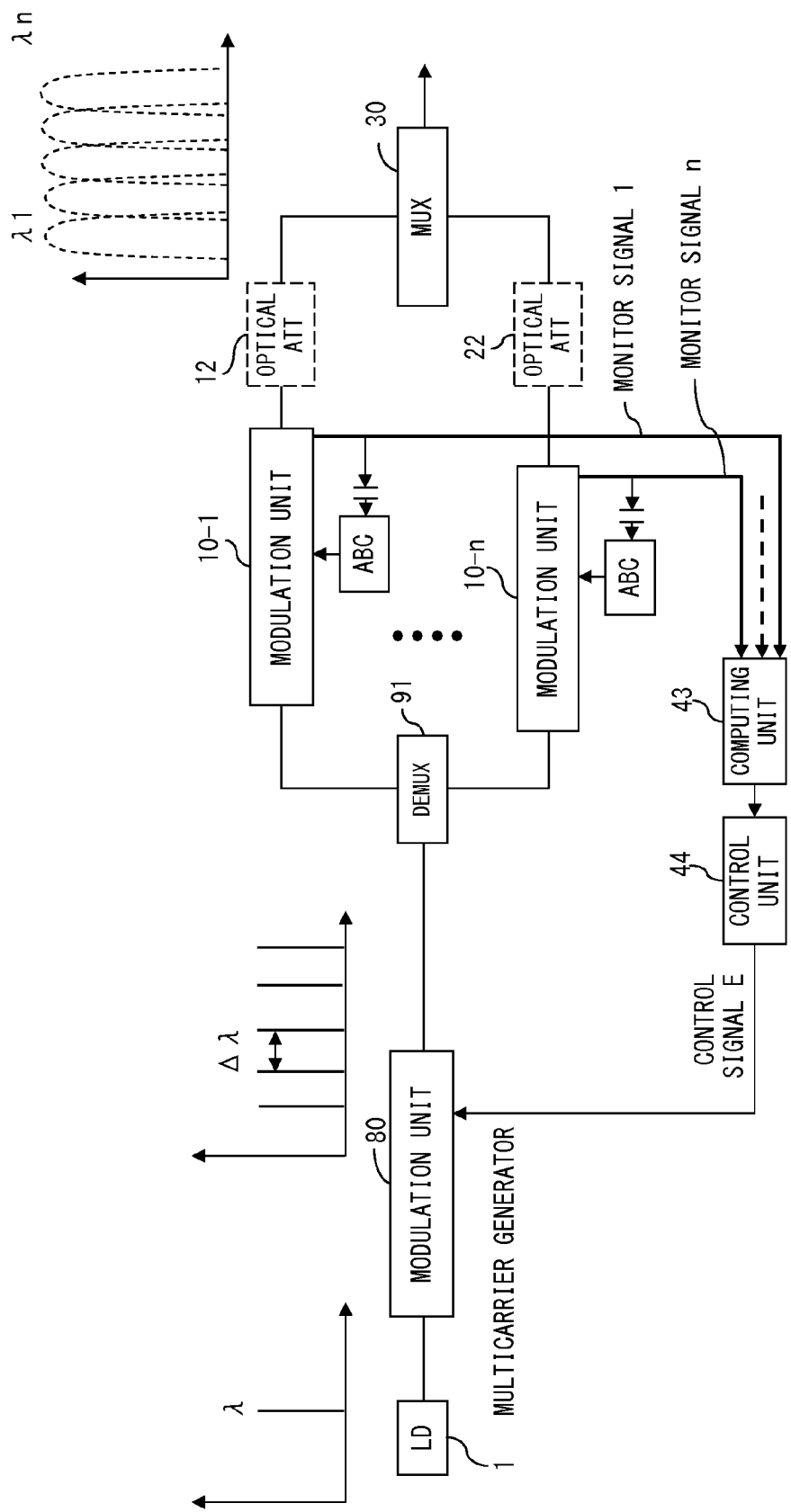
FIG. 24 is a diagram illustrating the configuration of an optical signal transmitter according to the third aspect.

FIG. 24 is a diagram illustrating the configuration of the optical signal transmitter according to the third aspect. In FIG. 24, a light source (LD) 1 outputs light having a wavelength λ. The output light of the light source 1 is, for example, a continuous wave. A modulation unit 80 has an LN modulator, and generates a plurality of optical subcarriers 1 through n from the output light of the light source 1. The wavelengths λ1 through λn are different from each other by Δλ.

A demultiplexer 91 separates the plurality of subcarriers 1 through n by each wavelength. The subcarrier 1 through n are respectively directed to modulation units 10-1 through 10-n. The configuration and operation of each of the modulation units 10-1 through 10-n are the same as those of the modulation units 10, 20 of the first or second aspect. Specifically, the modulation units 10-1 through 10-*n* respectively generate modulated optical signals 1 through n by modulating the subcarriers 1 through n with corresponding transmission data. Then, the modulated optical signals 1 through n are multiplexed by a multiplexer 30, and output to an optical fiber transmission path. The multiplexer 30 is, for example, a polarization beam combiner or a wavelength multiplexer. Thus, a plurality of data streams are transmitted using a plurality of wavelengths λ1 through λn. In this case, the plurality of data streams may be transmitted in accordance with the OFDM system.

A computing unit 43 compares the powers of output lights of the modulation units 10-1 through 10-*n*. Then, a control unit 44 generates a control signal E for making the powers of the output lights of the modulation units 10-1 through 10-*n* approximately equal to each other. The control signal E is given to, for example, the modulation unit 80. In this case, the bias of the LN modulator provided in the modulation unit 80 is controlled in accordance with the control signal E.

Figure 25:
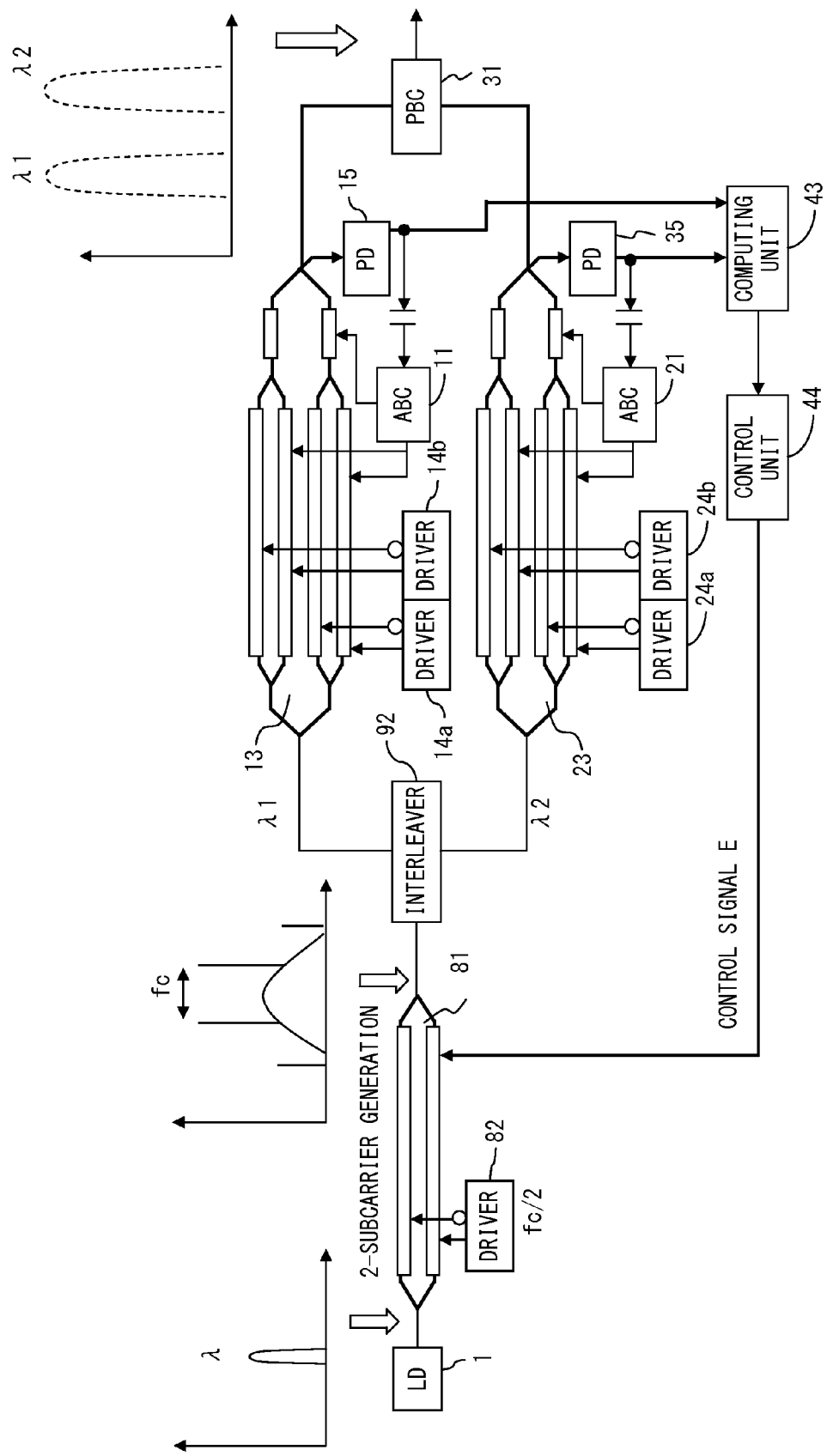
FIG. 25 illustrates the thirteenth embodiment of an optical signal transmitter.

FIG. 25 illustrates the thirteenth embodiment of the optical signal transmitter. In the thirteenth embodiment, a CS-RZ optical modulator 81 is provided as the modulation unit 80. The CS-RZ optical modulator 81 is a Mach-Zehnder LN modulator, which operates as an intensity modulator. A driver circuit 82 generates a drive signal for driving the CS-RZ optical modulator 81. The frequency of the drive signal is "fc/2".

The configuration in which a plurality of subcarriers are generated using an optical modulator is described in, for example, A. Sano, H. Masuda, et al., "30×100-Gb/s all-optical OFDM transmission over 1300 km SMF with 10 ROADM nodes"

A continuous wave having a wavelength λ output from the light source 1 is input to the CS-RZ optical modulator 81. In addition, the CS-RZ optical modulator 81 is driven, as described above, by the drive signal having a frequency fc/2. Meanwhile, the amplitude of the drive signal in the CS-RZ modulation is generally 2Vπ, as illustrated in FIG. 26. In this case, in the output light of the CS-RZ optical modulator 81, a pair of subcarriers with wavelength λ1 and λ2 are generated. The difference between wavelengths λ1 and λ2 of the pair of subcarriers corresponds to the frequency fc.

The output light of the CS-RZ optical modulator 81 is directed to an interleaver 92. The interleaver 92 corresponds to the demultiplexer 91 as illustrated in FIG. 24, and operates as an optical switch. The interleaver 92 extracts the λ1 and λ2 components, and directs the λ1 component to a DQPSK optical modulator 13, while directing the λ2 component to a DQPSK optical modulator 23. That is, the subcarriers λ1, λ2 are directed to the DQPSK optical modulators 13, 23.

The configuration and operation of the DQPSK optical modulators 13, 23 and the polarization beam combiner 31 are the same as those in the first and second aspects. Therefore, the DQPSK optical modulator 13 generates a modulated optical signal X by modulating the subcarrier λ1 using transmission data X. In the same manner, the DQPSK optical modulator 23 generates a modulated optical signal Y by modulating the subcarrier λ2 using transmission data Y. The polarization beam coupler 31 performs polarization multiplexing of the modulated optical signals X, Y.

The operations of the computing unit 43 and the control unit 44 are similar to those of the computing unit 41 and the control unit 42 in the first aspect. Specifically, the computing unit 43 calculates the difference between the powers of output lights of the DQPSK optical modulators 13, 23. At this time, the DC components of signals detected for the ABC circuits 11, 21 may be used as the powers of the output lights of the DQPSK optical modulators 13, 23. Alternatively, the powers of the output lights of the DQPSK optical modulators 13, 23 may be detected using the split-off portions of the optical modulation signals X, Y directed to the polarization beam coupler 31. Then, the control unit 44 generates a control signal E for making the difference obtained by the computing unit 43 zero.

Figure 27:
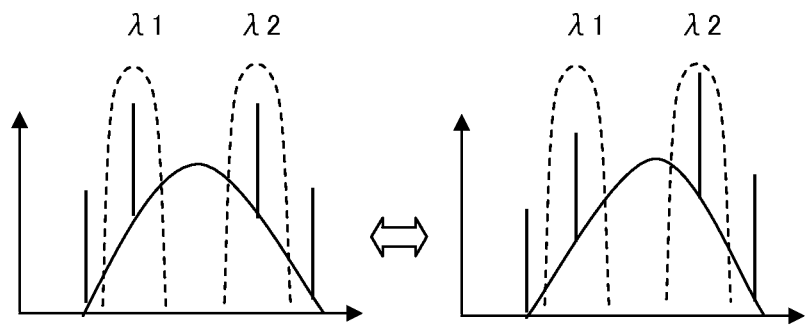
FIG. 27 is a diagram illustrating the relationship between the optical power of subcarriers and a bias.

The control signal E is given to, for example, the CS-RZ optical modulator 81. In this case, the control signal E controls the DC bias voltage of the CS-RZ optical modulator 81. At this time, the spectrum of the output light of the CS-RZ optical modulator 81 changes in accordance with the DC bias voltage, as illustrated in FIG. 27. In other words, the intensity of each subcarrier can be adjusted by controlling the DC bias voltage of the CS-RZ optical modulator 81. Therefore, in the third aspect, the power balance of the subcarrier λ1, λ2 are adjusted by controlling the DC bias voltage of the CS-RZ optical modulator 81, so as to make the difference between the powers of the output lights of the DQPSK optical modulator 13, 23 zero. This makes it possible to make the optical power of the plurality of multiplexed and transmitted subcarriers constant, improving the transmission quality.

While the DC bias voltage of the CS-RZ optical modulator 81 is controlled in the configuration illustrated in FIG. 25, other elements may be controlled using the control signal E. In other words, the amplitude of the drive signal of the DQPSK optical modulators 13, 23, the DC bias voltage of the DQPSK optical modulators 13, 23, the attenuation amount of the optical attenuators 12, 22 may be controlled using the control signal E.

FIG. 28 illustrates the fourteenth embodiment of the optical signal transmitter. The configuration of the optical signal transmitter according to the fourteenth embodiment is similar to that of the thirteenth embodiment illustrated in FIG. 25. However, in the fourteenth embodiment, a multiplexer 32 is provided instead of the polarization beam combiner 31 illustrated in FIG. 25. The plurality of subcarrier signals (modulated optical signals X, Y) are multiplexed and transmitted by the multiplexer 32.

Figure 30:
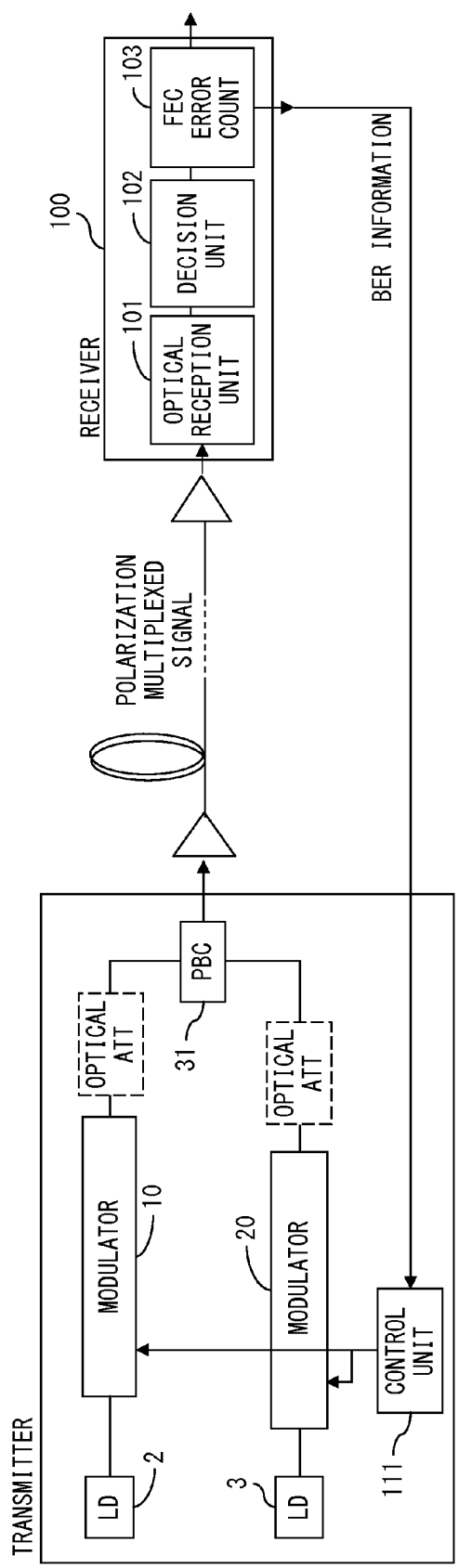
FIG. 30 is a diagram (2) illustrating the configuration for performing feedback control in accordance with the received signal quality.
Figure 31:
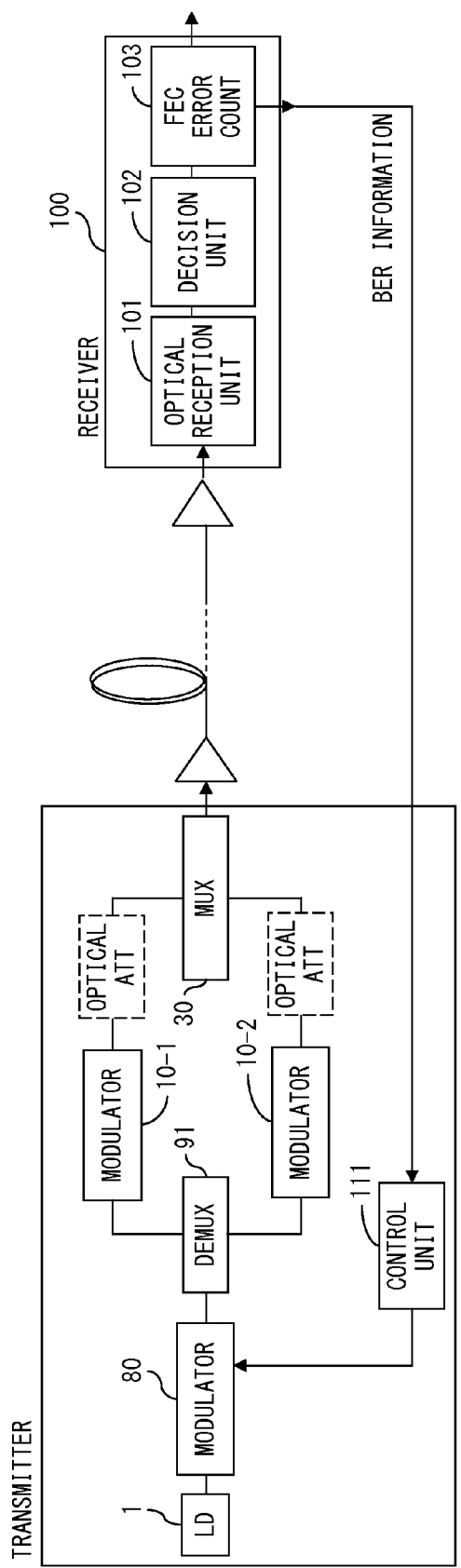
FIG. 31 is a diagram (3) illustrating the configuration for performing feedback control in accordance with the received signal quality.

FIG. 29 through FIG. 31 are diagrams illustrating the configuration for performing feedback control in accordance with the received signal quality. FIG. 29, FIG. 30, FIG. 31 illustrates the configuration in which the feedback control in accordance with the received signal quality is applied to the optical signal transmitter illustrated in FIG. 1A-1B, FIG. 12A-12B, FIG. 24, respectively.

As illustrated in FIG. 29 through FIG. 31, a receiver 100 has an optical receiver unit 101, a decision unit 102, and an FEC error count unit 103. The optical receiver unit 101 receives an optical signal (here, polarization multiplexed optical signal) transmitted from a transmitter, and converts it into an electric signal. The decision unit 102 decides each symbol of the received signal, and recovers the transmission data stream. The FEC error count unit 103 counts the FEC error number (or, error frequency) of the recovered transmission data stream, thereby obtaining the bit error rate (BER) information.

A control unit 111 controls the amplitude of the drive signal of the modulation unit, the DC bias voltage of the modulation unit, or the attenuation amount of the optical attenuator according to the BER information. At this time, for example, feedback control for minimizing the BER is performed, thereby appropriately adjusting the power balance between the X polarized wave and the Y polarized wave of the polarization multiplexed optical signal. While the control unit 111 is provided within the optical transmitter in the examples illustrated in FIG. 29 through FIG. 31, the configuration may also be made so as to dispose the control unit 111 in the receiver 100.

While the first through third aspects described above illustrates the configurations for transmitting a DQPSK signal, the configuration is not limited to this, and modulated optical signals in other formats may be transmitted by the optical signal transmitters according to the first through third aspects.

In addition, in the first through third aspects, the feedback control adjusting the optical powers of the modulated optical signals X, Y are, for example, periodically repeated. Alternatively, the feedback control described above may be performed at the time of the initial setting and under a predetermined condition (for example, when the temperature of the optical signal transmitter changes).

According to the embodiments of the first aspect, even when, for example the characteristics of the first and second modulation units are not the same, the optical powers of the first and second modulated optical signals transmitted by the polarization multiplexed optical signal become approximately equal to each other.

According to the embodiments of the second aspect, the symbol rate component in the polarization multiplexed optical signal depends on the power difference between the first and second modulated optical signals. Therefore, the control of at least one of the first and second modulation units in accordance with the symbol rate component in the polarization multiplexed optical signal makes the optical powers of the first and second modulated optical signals approximately equal to each other.

According to the embodiments of the third aspect, the intensity of the first and second wavelength components for generating the first and second modulated optical signals is adjusted by controlling the intensity modulation unit. Therefore, even when, for example the characteristics of the first and second modulation units are not the same, the optical powers of the first and second modulated optical signals transmitted by the polarization multiplexed optical signal become approximately equal to each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:
1. An optical signal transmitter comprising:
an intensity modulation unit configured to adjust an intensity of a first wavelength component and a second wavelength component, a first wavelength of the first wavelength component being different from a second wavelength of the second wavelength component;
a demultiplexer configured to extract the first wavelength component and the second wavelength component;
a first modulation unit configured to generate a first modulated optical signal from the first wavelength component obtained by the demultiplexer;
a second modulation unit configured to generate a second modulated optical signal from the second wavelength component obtained by the demultiplexer;
a multiplexer configured to multiplex the first modulated optical signal and the second modulated optical signal to generate a multiplexed optical signal; and
a control unit configured to control the intensity modulation unit so that optical powers of the first modulated optical signal and the second modulated optical signal become approximately equal to each other.
2. The optical signal transmitter according to claim 1,
wherein the intensity modulation unit has an LN modulator; and
wherein the control unit controls a bias of the LN modulator.
3. The optical signal transmitter according to claim 1, wherein the multiplexer performs polarization multiplexing of the first modulated optical signal and the second modulated optical signal.

* * * * *